(12) United States Patent  
Sugiyama et al.

(10) Patent No.: US 11,396,101 B2
(45) Date of Patent: Jul. 26, 2022

(54) OPERATING SYSTEM, CONTROL DEVICE, AND COMPUTER PROGRAM PRODUCT

(71) Applicant: Kabushiki Kaisha Toshiba, Minato-ku (JP)

(72) Inventors: Nobukatsu Sugiyama, Kawasaki (JP); Yoshiyuki Ishihara, Kawasaki (JP); Junji Oaki, Kawasaki (JP); Ping Jiang, Ota (JP); Seiji Tokura, Kawasaki (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 400 days.

(21) Appl. No.: 16/550,351

(22) Filed: Aug. 26, 2019

(65) Prior Publication Data

US 2020/0147804 A1    May 14, 2020

(30) Foreign Application Priority Data

Nov. 8, 2018  (JP) .............................. JP2018-210570
Feb. 27, 2019  (JP) .............................. JP2019-033983

(51) Int. Cl.
 *B25J 9/16*  (2006.01)
 *G06T 7/73*  (2017.01)

(52) U.S. Cl.
 CPC ............. *B25J 9/1697* (2013.01); *B25J 9/163* (2013.01); *B25J 9/1664* (2013.01); *G06T 7/73* (2017.01);
(Continued)

(58) Field of Classification Search
 CPC ........ B25J 9/1697; B25J 9/163; B25J 9/1664; G06T 7/73; G05B 2219/3755;
(Continued)

(56) References Cited

U.S. PATENT DOCUMENTS 8,396,595 B2  3/2013  Dariush
9,517,563 B2  12/2016  Watanabe
(Continued)

FOREIGN PATENT DOCUMENTS

JP    60-15780 A    1/1985
JP    7-75982 A    3/1995
(Continued)

OTHER PUBLICATIONS

U.S. Appl. No. 16/107,183, filed Aug. 21, 2018, Sugiyama, N, et al.
(Continued)

*Primary Examiner* — Abby Y Lin
*Assistant Examiner* — Dylan Brandon Mooney
(74) *Attorney, Agent, or Firm* — Oblon, McClelland, Maier & Neustadt, L.L.P.

(57) ABSTRACT

An operating system according to an embodiment includes a target surface detection unit, a position calculation unit, a direction calculation unit, and a movement control unit. The target surface detection unit detects a target surface of a target object from a depth image obtained by a depth sensor. The position calculation unit calculates a first position for the detected target surface. The direction calculation unit calculates a first direction for the detected target surface. The movement control unit controls an actuator so as to reduce a positional deviation between a second position fixed with respect to the movable member and the first position and to reduce a directional deviation between a second direction fixed with respect to the movable member and the first direction.

10 Claims, 16 Drawing Sheets

(52) U.S. Cl.
CPC .............. *G05B 2219/37555* (2013.01); *G05B 2219/40053* (2013.01); *G05B 2219/45063* (2013.01); *G06T 2207/10028* (2013.01); *G06T 2207/20081* (2013.01)

(58) Field of Classification Search
CPC ........... G05B 2219/40053; G05B 2219/45063; G05B 2219/10028; G05B 2219/20081
See application file for complete search history.

(56) References Cited

U.S. PATENT DOCUMENTS

| | | | |
|---|---|---|---|
| 9,746,855 | B2 | 8/2017 | Kobayashi et al. |
| 2014/0163737 | A1* | 6/2014 | Nagata .................. B25J 9/1697 700/259 |
| 2014/0314308 | A2* | 10/2014 | Kitamura ............... G01B 11/24 382/154 |
| 2018/0276501 | A1* | 9/2018 | Yamada ............... G06K 9/2027 |
| 2019/0143525 | A1 | 5/2019 | Ishihara et al. |
| 2019/0262991 | A1 | 8/2019 | Sugiyama et al. |

FOREIGN PATENT DOCUMENTS

| | | |
|---|---|---|
| JP | 2000-94370 A | 4/2000 |
| JP | 2004-1122 A | 1/2004 |
| JP | 2010-247959 A | 11/2010 |
| JP | 2013-139657 A | 7/2013 |
| JP | 5261495 B2 | 8/2013 |
| JP | 2014-046433 A | 3/2014 |
| JP | 2015-85434 A | 5/2015 |
| JP | 2015085434 A * | 5/2015 |
| JP | 2015-150636 A | 8/2015 |
| JP | 2016-186488 A | 10/2016 |
| JP | 2017-094482 A | 6/2017 |
| JP | 2017-217726 A | 12/2017 |
| JP | 2018-161692 A | 10/2018 |
| JP | 2019-089188 A | 6/2019 |
| JP | 2019-150895 A | 9/2019 |
| WO | WO 2005/087452 A1 | 9/2005 |

OTHER PUBLICATIONS

Malis, E, et al., "2D½ visual servoing stability analysis with respect to camera calibration errors", Proceedings of the 1998 IEEE/RSJ International Conference of Intelligent Robots and Systems, Innovations in Theory, Practice, and Applications, 1998, vol. 2, pp. 691-697.

* cited by examiner

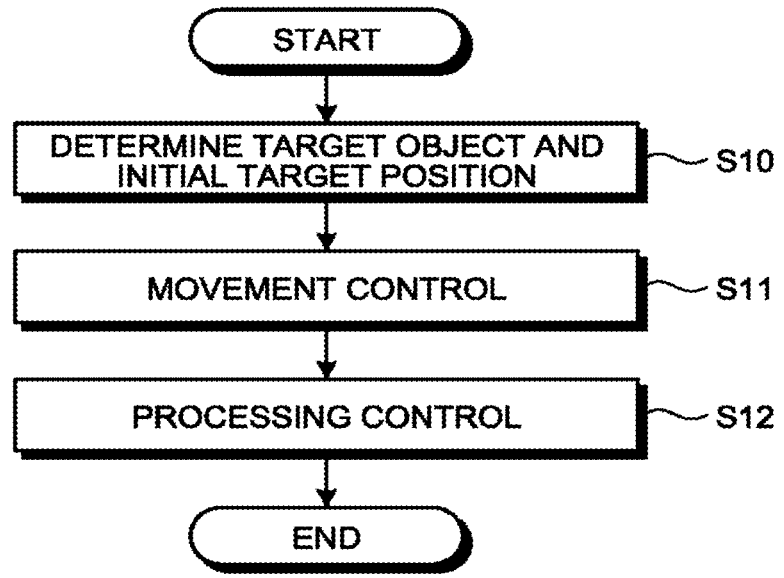
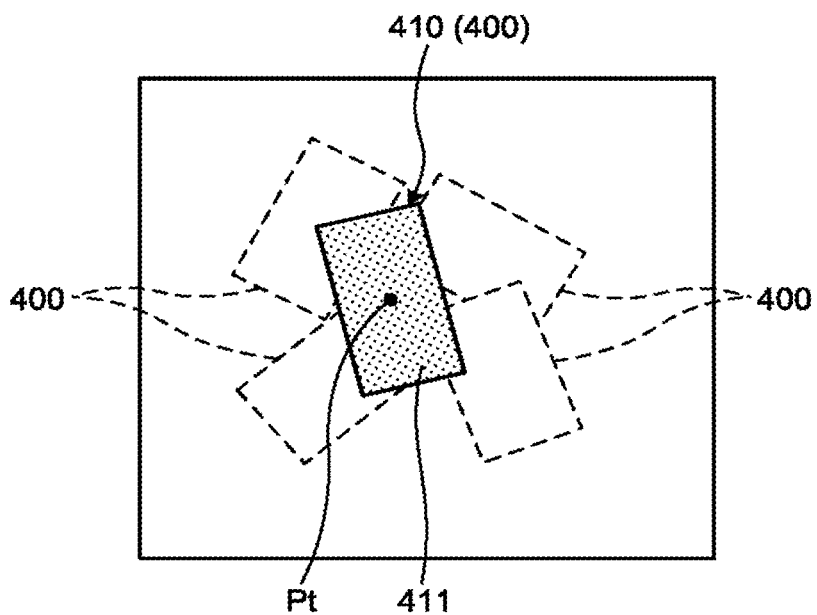

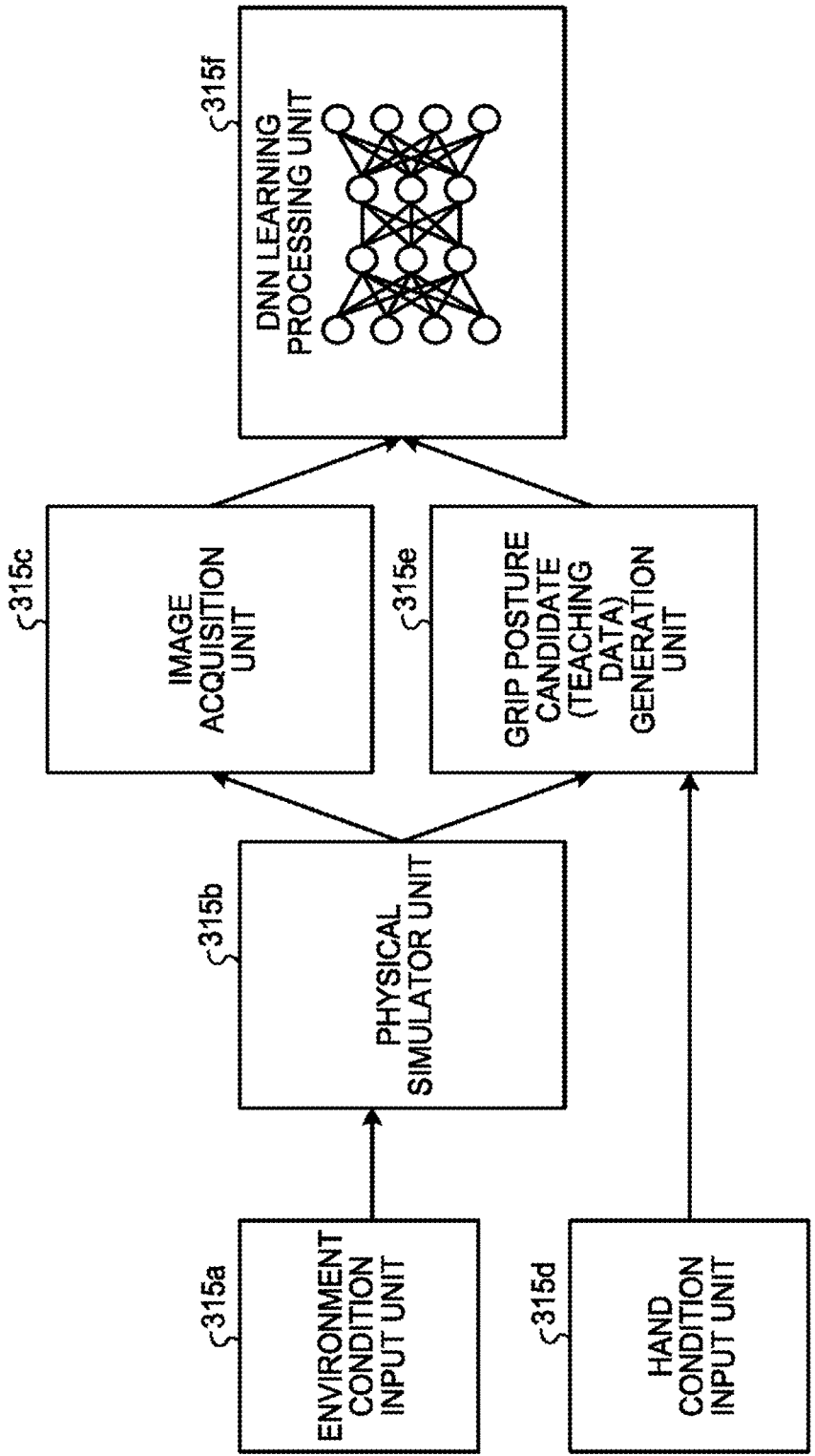

FIG.20A
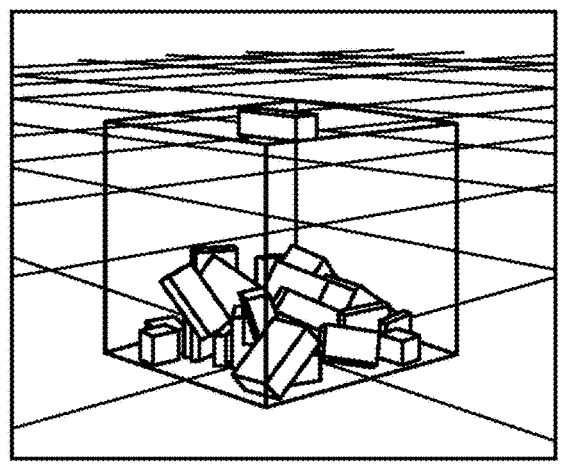
FIG.20B
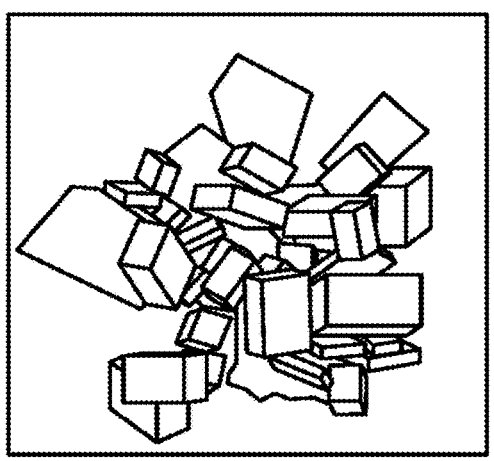
FIG.20C
| COORDINATES | CLASSIFICATION | EVALUATION VALUE |
|---|---|---|
| 1, 1 | BAD | 0.00 |
| 1, 2 | BAD | 0.00 |
| ⋮ | ⋮ | ⋮ |
| 121, 99 | GOOD | 0.70 |
| 121, 100 | GOOD | 0.72 |
| ⋮ | ⋮ | ⋮ |

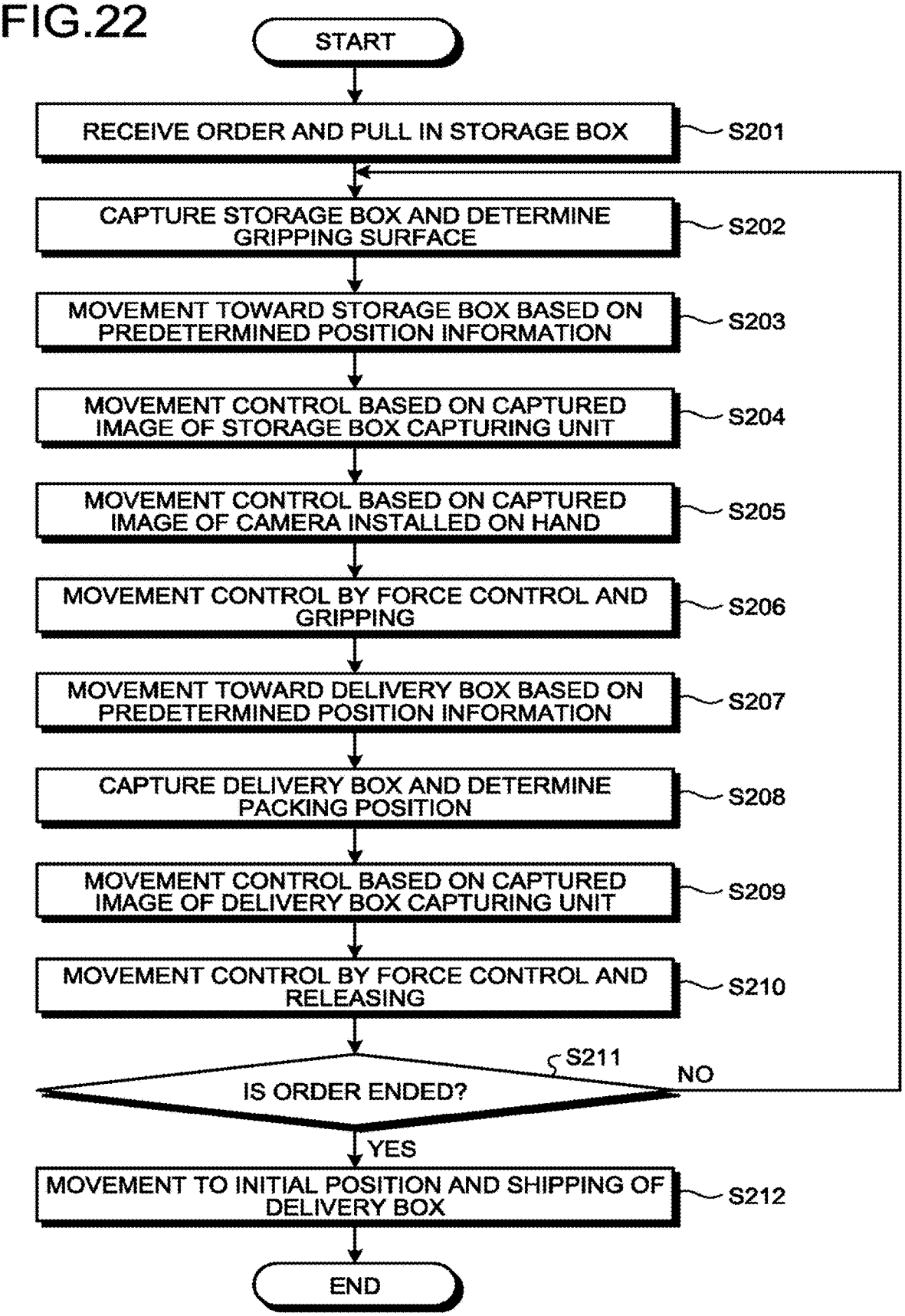

OPERATING SYSTEM, CONTROL DEVICE, AND COMPUTER PROGRAM PRODUCT

CROSS-REFERENCE TO RELATED APPLICATIONS

This application is based upon and claims the benefit of priority from Japanese Patent Application No. 2018-210570, filed on Nov. 8, 2018 and Japanese Patent Application No. 2019-033983, filed on Feb. 27, 2019; the entire contents of all of which are incorporated herein by reference.

FIELD

Embodiments described herein relate to an operating system, a control device, and a computer program product.

BACKGROUND

Conventionally, operating systems that execute feedback control by visual servos have been known.

BRIEF DESCRIPTION OF THE DRAWINGS

FIG. 3 is an exemplary flowchart illustrating a procedure of processing executed in the operating system of the embodiment;

FIG. 4 is a schematic and exemplary view illustrating a target object determined from among a plurality of processing objects in a depth image by the operating system of the embodiment;

FIG. 19 is an exemplary block diagram of a learning system that creates the learned deep neural network of the operating system of the third embodiment;

FIG. 20A is schematic and an exemplary perspective view illustrating a virtual data model in a bulk state generated on a calculation space by a physical simulator unit of the operating system of the third embodiment;

FIG. 20B is a schematic and exemplary view of a depth image generated from the virtual data model in the bulk state generated by the physical simulator unit of the operating system of the third embodiment;

FIG. 20C is a schematic and exemplary view illustrating grip posture candidate information obtained by the operating system of the third embodiment;

FIG. 22 is an exemplary flowchart illustrating a procedure of picking using the picking system of the fourth embodiment.

DETAILED DESCRIPTION

An operating system according to an embodiment includes a target surface detection unit, a position calculation unit, a direction calculation unit, and a movement control unit. The target surface detection unit detects a target surface of a target object from a depth image obtained by a depth sensor. The position calculation unit calculates a first position for the detected target surface. The direction calculation unit calculates a first direction for the detected target surface. The movement control unit controls an actuator so as to reduce a positional deviation between a second position fixed with respect to the movable member and the first position and to reduce a directional deviation between a second direction fixed with respect to the movable member and the first direction.

Hereinafter, exemplary embodiments of the operating system will be disclosed. Configurations and control (technical features) of the embodiments illustrated hereinafter, and functions and results (effects) provided by the configurations and control are examples.

In addition, the following embodiments include similar components. Hereinafter, those similar components will be denoted by the same reference signs, and redundant descriptions thereof will be sometimes omitted. In addition, ordinal numbers are given for the sake of convenience in order to distinguish components and the like, and do not indicate a priority or an order in the present specification.

FIRST EMBODIMENT

Overview

Figure 1:
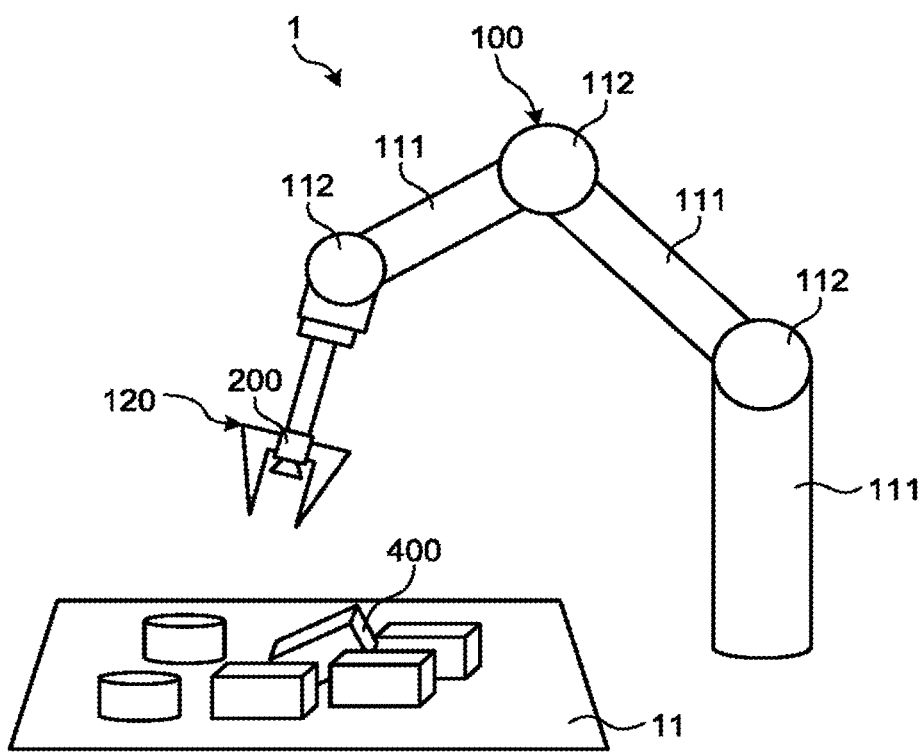
FIG. 1 is an exemplary configuration view of an operating system of an embodiment.

FIG. 1 is a block diagram of an operating system 1. As illustrated in FIG. 1, the operating system 1 includes an operating device 100. The operating device 100 is an articulated robot, and has a plurality of arms 111 movably coupled to each other via joints 112. The plurality of arms 111 are coupled in series. A hand 120 is provided at a distal end of the plurality of arms 111 via the joint 112. The arm 111 and the hand 120 are examples of movable members. The hand 120 can be referred to as a manipulator, an access unit, a processor, or the like. Positions and orientations of the arm 111 and the hand 120 can be changed or maintained by operating actuators 113 and 114 (see FIG. 2). Examples of the actuator include a motor, a pump with a motor, a solenoid, an electromagnetic valve with a solenoid, a piston cylinder, and the like, but are not limited thereto. In addition, the hand 120 is, for example, a vacuum chuck, a gripper, or the like, but is not limited thereto.

On a field 11 (an area or a stage), a processing object 400 to be processed by the operating device 100 is placed. Incidentally, the processing object 400 may be accommodated in a vessel such as a pallet and a container, may be mounted on a conveying device such as a belt conveyor and a roller conveyor, or may be mounted on a fixed base such as a table and a pedestal. In addition, the processing by the operating device 100 in the present embodiment is, for example, gripping the processing object 400 with the hand 120 and transporting the processing object 400 to a given position. However, the processing by the operating device 100 is not limited to the grip and transportation.

The operating system 1 executes servo control based on a depth image captured by a depth camera 200 such that the processing by the operating device 100 can be executed more reliably or more smoothly. In the present embodiment, the operating system 1 controls the actuator 113 (see FIG. such that the hand 120 takes an execution posture or an initial posture (target posture) of processing of the processing object 400 at an execution position or an initial position (target position) of the processing of the processing object 400. In addition, the operating system 1 controls the actuators 13 and 114 so as to execute given processing when the hand 120 reaches the target position and takes the target posture. The operating system 1 can be also referred to as a robot handling system, a manipulator system, an object tracking system, or a servo operating system.

The depth camera 200 acquires the depth image. Depth image data is distance data (depth data) at each two-dimensional pixel. The depth camera 200 is an example of a depth sensor. Incidentally, the depth camera 200 may acquire an RGB image. In this case, the depth camera 200 is an RGB-D sensor, and the data obtained from the depth camera 200 includes depth image data and two-dimensional RGB image data.

Figure 2:
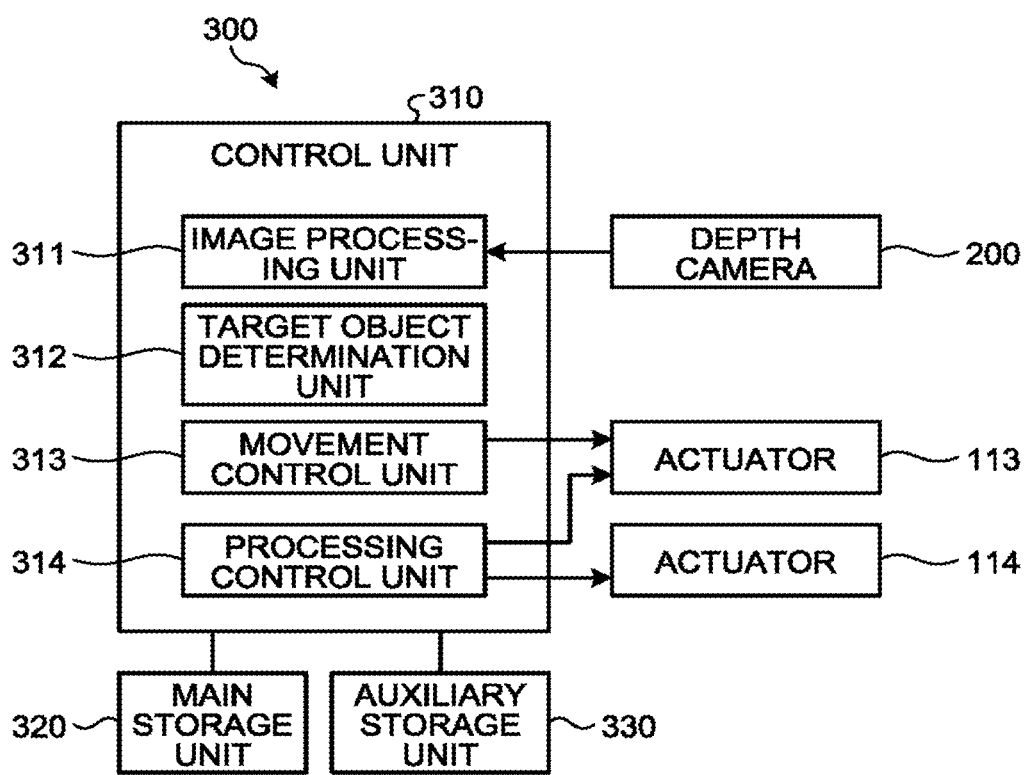
FIG. 2 is an exemplary block diagram of the operating system of the embodiment.

FIG. 2 is a block diagram of the operating system 1. The operating system 1 includes a control device 300. The control device 300 includes a control unit 310, a main storage unit 320, an auxiliary storage unit 30, and the like. The control unit 310 is, for example, a central processing unit (CPU), a controller, or the like, and the main storage unit 320 is, for example, a read only memory (ROM), a random access memory (RAM), or the like.

Arithmetic processing and control by the control unit 310 may be executed by software or hardware. In addition, the arithmetic processing and control by the control unit 310 may include arithmetic processing and control by software and arithmetic processing and control by hardware. In the case of the arithmetic processing and control by software, the control unit 310 reads and executes a program (application) stored in a ROM, a HDD, an SSD, a flash memory or the like. The control unit 310 operates according to the program to function as each unit included in the control unit 310, that is, an image processing unit 311, a target object determination unit 312, a movement control unit 313, a processing control unit 314, and the like. In this case, the program includes modules corresponding to these respective units.

The program can be provided in the state of being recorded as a file in an installable format or in an executable format in a recording medium that is readable by a computer such as a CD-ROM, an ED, a CD-R, a DVD, and a USB memory. In addition, the program can be stored in a storage unit of a computer connected to a communication network and introduced by being downloaded via the network. In addition, the program may be incorporated in advance in a ROM or the like.

In addition, when the control unit 310 is entirely or partially configured by hardware, the control unit 310 can include, for example, a field programmable gate array (FPGA), an application specific integrated circuit (ASIC), or the like.

The image processing unit 311 acquires the depth image data from the depth camera 200. When the depth camera 200 is the RGB-D sensor, the image processing unit 311 can acquire two-dimensional RGB image data together with the depth image data. In addition, when the operating system 1 includes a camera (not illustrated) different from the depth camera 200, the image processing unit 311 can acquire depth image data and two-dimensional RGB image data by the camera.

In addition, the image processing unit 311 calculates three-dimensional point group data based on the distance data at each position by coordinate conversion using a camera matrix of the depth camera 200. The three-dimensional point group data is data indicating a three-dimensional position for each pixel of the depth camera 200.

When coordinates of the depth image are set to $u_i$ and $v_i$, the depth is $$z_{(u_i, v_i)}$$

, and the camera matrix is $M_c$, the three-dimensional point group data can be expressed by the following Formula (1).

$$p_{(u_i,v_i)} = [x_{(u_i,v_i)}, y_{(u_i,v_i)}, z_{(u_i,v_i)}]^T = M_c^{-1}[u_i, v_i, 1]^T x_{(u_i,v_i)} \quad (1)$$

Incidentally, the three-dimensional point group data is also included in the depth image data. That is, the depth image data includes distance data and three-dimensional point group data (three-dimensional position data) for each of pixels of the depth camera 200 (position coordinates in a two-dimensional coordinate system of the depth camera 200).

The target object determination unit 312 determines (an image of) a target object 410 (see FIG. 4), which satisfies a given condition regarding a presence position, a size, or the like, from at least one processing object 400 based on an initial image of the depth image. Here, the initial image of the depth image is a depth image obtained by the depth camera 200 in a state where the hand 120 is located at a start position of movement control.

The movement control unit 313 controls the actuator 113 such that the hand 120 is at given position and takes given posture with respect to the target object 410 and a target surface 411, that is, a target position and a target posture. The movement control unit 313 executes servo control based on the depth image.

In the state where the hand 120 reaches the target position and takes the target posture, the processing control unit 314 controls the actuators 113 and 114 such that the operating device 100 (the hand 120) executes given processing, for example, a grip operation of the target object 410.

Various operations relating to a position, a direction, and a posture in the control unit 310 are executed based on values in a three-dimensional coordinate system fixed to the depth camera 200, for example, but are not limited thereto, and may be executed by values in another three-dimensional coordinate system, such as a three-dimensional coordinate system fixed to the field 11, after coordinate conversion processing is performed.

FIG. 3 is a flowchart illustrating a procedure of processing by the control device 300. As illustrated in FIG. 3, the target object determination unit 312 first determines the target object 410 and an initial target position (S10), and then, the movement control unit 313 executes movement control (S11). In S11, as the hand 120 moves, a comparison of a positional deviation between a current position and the target position with a position threshold and a comparison of a directional deviation between a current direction and a target direction with a direction threshold are executed in each time step (for example, within a frame rate of 30 fps), and the movement control ends when the positional deviation becomes the position threshold or less and the directional deviation becomes the direction threshold or less. Next, the processing control unit 314 executes processing control (S12).

Incidentally, a position where the hand 120 starts processing (for example, grip) on the target object 110 and the target surface 411, in other words, a position before execution of the processing is the target position, a posture of the hand 120 at the target position at the start of the processing, in other words, the posture of the hand 120 before execution of the processing is the target posture (target direction), and the control unit 310 executes the processing control after execution of the movement control in the present embodiment. However, the present invention is not limited thereto, and a position when the hand 120 executes the processing on the target object 410 and the target surface 411 or after execution of the processing may be the target position, and a posture when the hand 120 executes the processing on the target object 410 and the target surface 411 or after execution of the processing may be the target posture. In such a case, the control unit 310 executes the processing control together with the movement control at a subsequent stage of the movement control.

Detailed Description of Target Object Determination Unit

FIG. 4 is a view illustrating the target object 410 determined from among a plurality of the processing objects 400. As illustrated in FIG. 4, the target object determination unit 312 determines, for example, the processing object 400 located at the top as the target object 410 among the plurality of stacked processing objects 400 based on an initial image of the depth image. The target object determination unit 312 can detect the processing object 400 located at the top among the plurality of processing objects 400 based on a relative position of the depth camera 200 with respect to the field 11 where the processing object 400 is present. Incidentally, when there is only one processing object 400, the target object determination unit 312 determines the one processing object 400 as the target object 410.

In addition, the target object determination unit 312 determines, for example, a barycenter (a center or a centroid) of a surface that is reflected to be the largest in the depth image among surfaces of the determined target object 410 as a temporary target position Pt in an initial state (here, an initial target position) and store data of the target position Pt (for example, coordinates in the depth image, a depth value, and a three-dimensional position) in a data storage unit 331. The data storage unit 331 is an example of a storage unit.

Incidentally, the target object determination unit 312 may perform convolution on the depth image using a Gaussian filter, determine a point closest to the depth camera 200 as the target position Pt, and determine the processing object 400 including the point as the target object 410. In addition, the target object determination unit 312 may determine the target position Pt corresponding to the depth image by executing a learning process based on multiple combinations of the depth image and the target position Pt determined from the depth image in a neural network. In this case, the target object determination unit 312 can determine the target position Pt from the depth image using an approximation function to determine the target position Pt from the depth image obtained by the learning process. In addition, the target object determination unit 312 may detect a region in which a normal direction at each point is within a threshold on a surface of the target object 410 separated from the other processing objects 400, determine a barycenter (a center or a centroid) in the region as the target position Pt, and determine a representative value of the normal direction as a target direction Dt.

Incidentally, the target object determination unit 312 may determine the target object 410 from an image captured by a camera (not illustrated) different from the depth camera 200, a detection signal from another sensor, or the like. In this case, a correlation between coordinates (a position) of the image taken by the other camera or the detection signal from the other sensor and coordinates (a position) the depth image captured by the depth camera 200 is acquired in advance.

Detailed Description of Movement Control Unit

Figure 5:
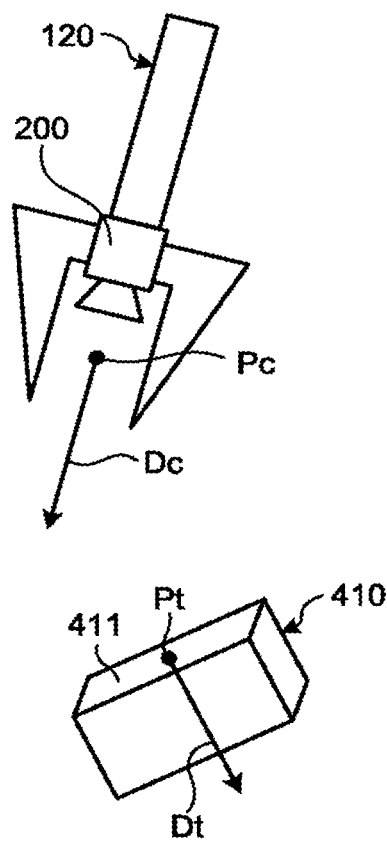
FIG. 5 is a schematic and exemplary perspective view illustrating an example of a current position, a current direction, a target position, and a target direction in the operating system of the embodiment.

FIG. 5 is a perspective view illustrating the target position Pt, the target direction Dt, a current position Pc, and a current direction Dc. The target position Pt and the target direction Dt are uniquely defined from the detected target surface 411 according to a given algorithm. The target position Pt is an example of a first position, and the target direction Dt is an example of a first direction. In addition, the current position Pc and the current direction Dc are fixed in a coordinate system of the depth camera 200 and fixed with respect to the hand 120 provided with the depth camera 200. The current position Pc is an example of a second position, and the current direction Dc is an example of a second direction.

The movement control unit 313 detects the target surface 411 from the depth image in each time step while the hand 120 moves from the initial position (not illustrated) to the target position Pt, calculates the target position Pt and the target direction Dt from the detected target surface 411, and calculates a command value for the actuator 113 so as to reduce the positional deviation between the target position Pt and the current position Pc and the directional deviation between the target direction Dt and the current direction Dc.

The actuator 113 operates according to the calculated command value, and as a result, the hand 120 moves such that the current position approaches the target position Pt and the current direction Dc approaches the target direction Dt. As such processing in each time step is repeated, the hand 120 approaches the target position Pt, and the posture of the hand 120 almost takes the target posture at the target position Pt.

In the example of FIG. 5, the target position Pt is set to the barycenter (the center or the centroid) of the target surface 411 detected in each time step, the target direction Dt is set to a normal direction (a direction away from the depth camera 200) of an approximate plane (not illustrated) of the target surface 411 detected in each time step or a representative value, for example, an average value of the normal directions at the respective points on the detected target surface 411. However, the target position Pt and the target direction Dt are not limited thereto, and may be another position and another direction which are calculated according to a given algorithm from the detected target surface 411 and uniquely defined with respect to the detected target surface 411. In addition, the target position Pt and the target direction Dt may be a position and a direction having given relative positional relationships with respect to a position representing the target surface 411, such as the barycenter of the detected target surface 411, and a direction representing the target surface 411 such as the normal direction of the target surface 411. In addition, the target position Pt and the target direction Dt can be appropriately set and appropriately changed in accordance with a specification such as a shape and a size of the processing object 400, a specification such as a structure, a size, or a gripping method of the hand 120, relative positions between the hand 120 and the depth camera 200, a relative imaging direction of the depth camera 200 with respect to the hand 120, or the like. Incidentally, the representative value is not limited to the average value.

In addition, the current position Pc is set to a position overlapping the target position Pt in a state where the hand 120 and the target object 410 have a desired relative positional relationship. Specifically, the current position Pc is set to a position overlapping the target position Pt in a state where the hand 120 grips the target object 410. In the example of FIG. 5, the hand 120 and the depth camera 200 are configured such that the target position Pt is located at the center (coordinates) of the depth image in the state where the hand 120 grips the target object 410. Accordingly, the current position Pc is set to the center (coordinates) of the depth image. However, the setting of the current position Pc is not limited thereto, and the current position Pc may be set to, for example, a position overlapping the target position Pt at the start of processing control (for example, grip control by the hand 120) executed by the processing control unit 314.

In addition, the current direction Dc is set to a direction overlapping the target direction Dt in a state where the hand 120 and the target object 410 have a given relative positional relationship. Specifically, the current direction Dc is set to a direction overlapping the target direction Dt in a state where the hand 120 grips the target object 410 and the current position Pc coincides with the target position Pt. In the example of FIG. 5, the hand 120 and the depth camera 200 are configured such that an optical axis direction of the depth camera 200 and the normal direction of the target surface 411 (the direction away from the depth camera 200) become parallel in the state where the hand 120 grips the target object 410. Accordingly, the current direction Dc is set to be parallel to the optical axis direction of the depth camera 200. However, the setting of the current direction Dc is not limited thereto, and the current direction Dc may be set to, for example, a direction overlapping the target direction Dt at the start of processing control (for example, grip control by the hand 120) executed by the processing control unit 314.

Figure 6:
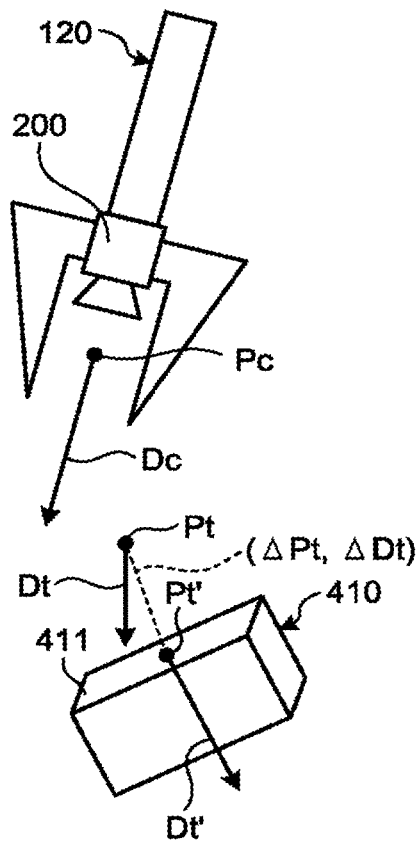
FIG. 6 is a schematic and exemplary perspective view illustrating a target position, a temporary target position, a target direction, a temporary target direction, distance difference data, posture difference data, a current position, and a current direction in the operating system of the embodiment.

FIG. 6 is a perspective view illustrating the target position Pt, a temporary target position Pt', the target direction Dt, a temporary target direction Dt', distance difference data ΔPt, posture difference data ΔDt, the current position Pc, and the current direction Dc. The movement control unit 313 may determine the target position Pt and the target direction Dt by the following operation. That is, the data storage unit 331 stores the distance difference data ΔPt and the posture difference data ΔDt. The movement control unit 313 sets, for example, the target position Pt and the target direction Dt in a previous time step as the temporary target position Pt' and the temporary target direction Dt', and can calculate the target position Pt based on the temporary target position Pt', the distance difference data ΔPt, and the posture difference data ΔDt and calculate the target direction Dt based on the temporary target direction Dt' and the posture difference data ΔDt.

Figure 7:
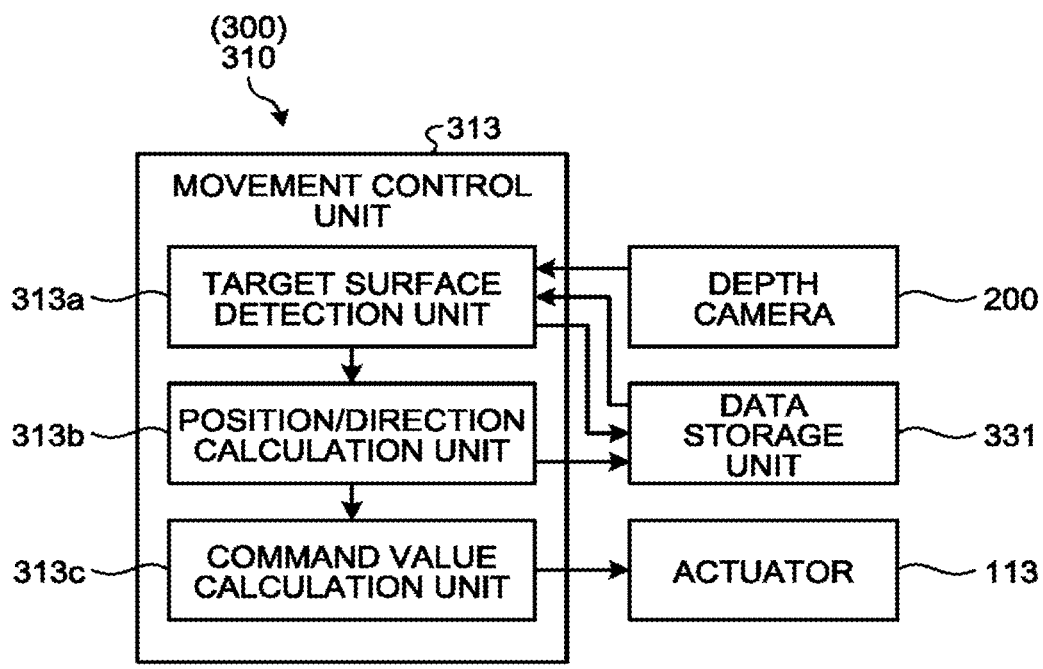
FIG. 7 is an exemplary block diagram of a movement control unitthe operating system of the embodiment.
Figure 8:
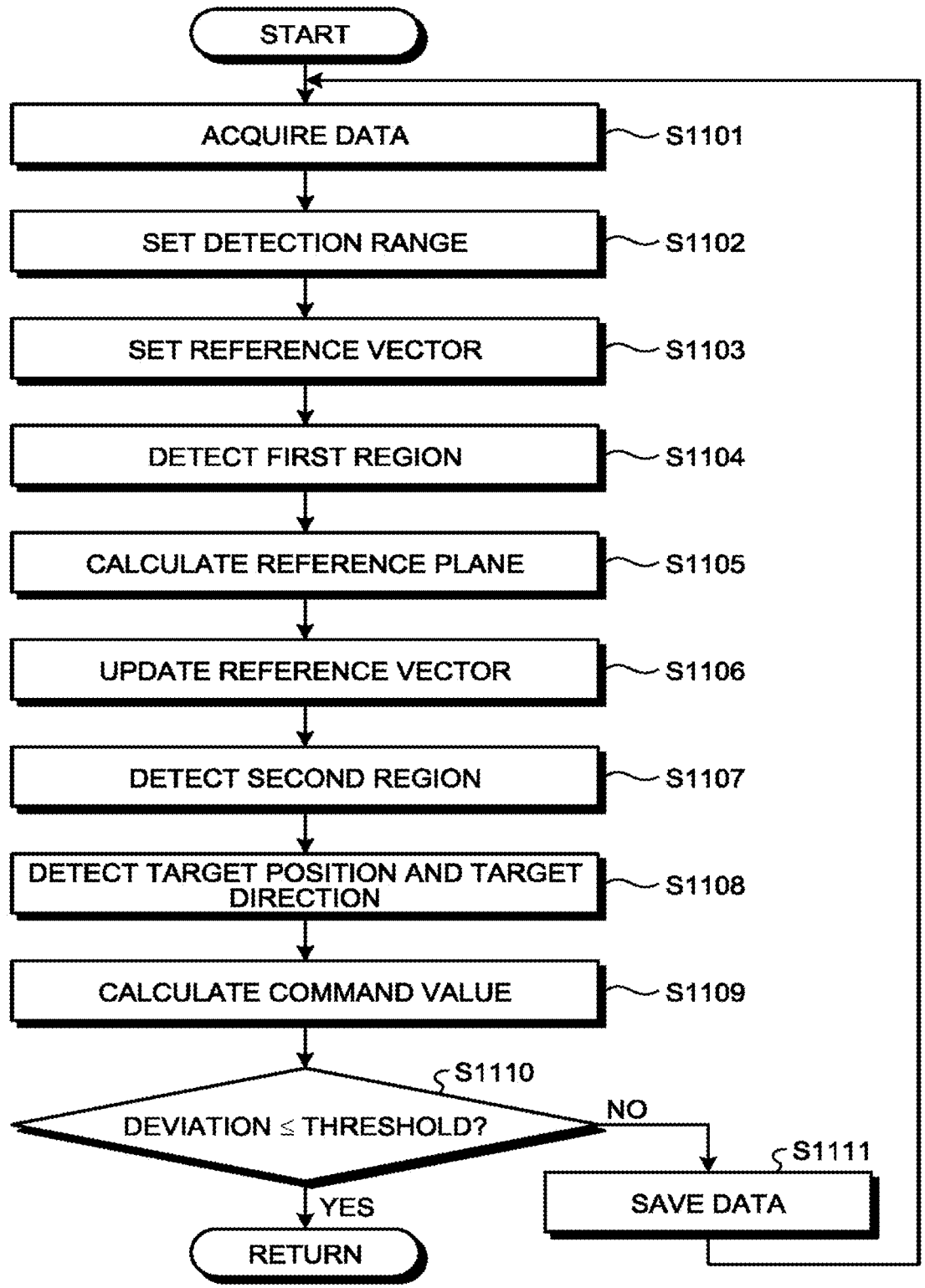
FIG. 8 is an exemplary flowchart illustrating procedures of arithmetic processing and control executed in a movement control unit of an operating system of a first embodiment.

FIG. 7 is a block diagram of the movement control unit 313. FIG. 8 is a flowchart illustrating procedures of arithmetic processing and control by the movement control unit 313. As illustrated in FIG. 7, the movement control unit 313 includes a target surface detection unit 313a, a position/direction calculation unit 313b, and a command value calculation unit 313c. The data storage unit 331 is configured by, for example, the auxiliary storage unit 330. The data storage unit 331 stores data (values) calculated in the respective time steps. The data stored in the data storage unit 331 is used in a subsequent time step.

In addition, S1101 to S1111 of FIG. 8 are executed in each time step, and the arithmetic processing and control according to the flow of FIG. 8 are ended at a point in time when it is determined as "Yes" in S1110.

The movement control unit 313 first functions as the target surface detection unit 313a, acquires a depth image (including three-dimensional point croup data) at a current time step from the image processing unit 311, and acquires data indicating the target position Pt and the target direction Dt in the previous time step stored in the data storage unit 331 (S1101). The previous time step is an example of a first time, and the current time step is an example of a second time.

Figure 9:
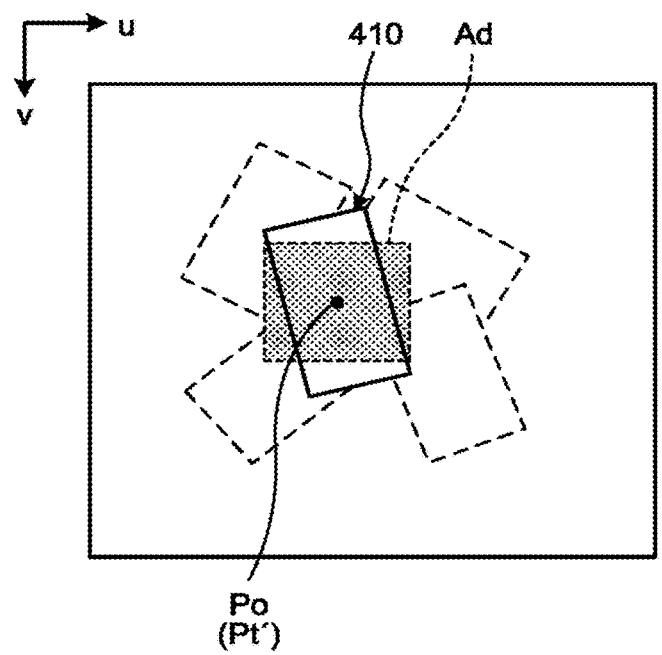
FIG. 9 is a schematic and exemplary view illustrating a specific range sit for the depth image by the operating system of e embodiment.

Next, the target surface detection unit 313a sets a specific range Ad, to be used for detection of the target surface 411, in a depth image (S1102). FIG. 9 is a view illustrating the specific range Ad set for the depth image. The specific range Ad is a quadrilateral region in two-dimensional coordinates of the depth image with a coordinate of the target position Pt' at the initial stage or previous time step stored in the data storage unit 331 as a center coordinate Po, and is a region including k pixels. The specific range Ad is a range narrower than the entire range of the depth image, and is a square region including 1681 (=k) pixels in total of 41 pixels in a u direction and 41 pixels in a v direction, for example, assuming that directions of coordinate axes in the two-dimensional coordinate system of the depth camera 200 are the u direction and the v direction. Incidentally, a shape of the specific range Ad is not necessarily the square shape. A specification such as a size and a shape of the specific range Ad can be appropriately set in accordance with a size and a shape of the processing object 400 in the depth image. The size of the specific range Ad may be set to be larger as a distance between the depth camera 200 and the target object 410 is shorter. In addition, coordinates of a center position (reference position) of the specific range Ad are not necessarily the same as the coordinates of the target position Pt in the previous time step, that is, not necessarily fixed on the depth image, and may move on the depth image, for example, using a known image tracking method or a method of converting movement of the depth camera 200 by the image Jacobian into movement on the depth image. In addition, the specific range Ad is not necessarily constant, and may be changed in accordance with the target object 410, or may be changed in each time step, for example.

Next, the target surface detection unit 313a sets a unit vector along the normal direction of the surface of the target object 410 in the current time step (the direction away from the depth camera 200) as a reference vector $n_o$ from the three-dimensional point group data in the current time step at a reference position having the same coordinates as the target position Pt in the previous time step and a peripheral position with peripheral coordinates (adjacent coordinates) with respect to the reference position (S1103). The target surface detection unit 313a can calculate a normal vector along the normal direction of each pixel by the following Formula (2). Incidentally, subscripts $u_i$ and $v_i$ indicate position coordinates of a point as a calculation target on the depth image, and i is a time step, hereinafter.

$$n_{(u_i,v_i)} = (p_{(u_i+1,v_i)} - p_{(u_i-1,v_i)}) \times (p_{(u_i,v_i+1)} + p_{(u_i,v_i-1)}) \quad (2)$$

Figure 10:
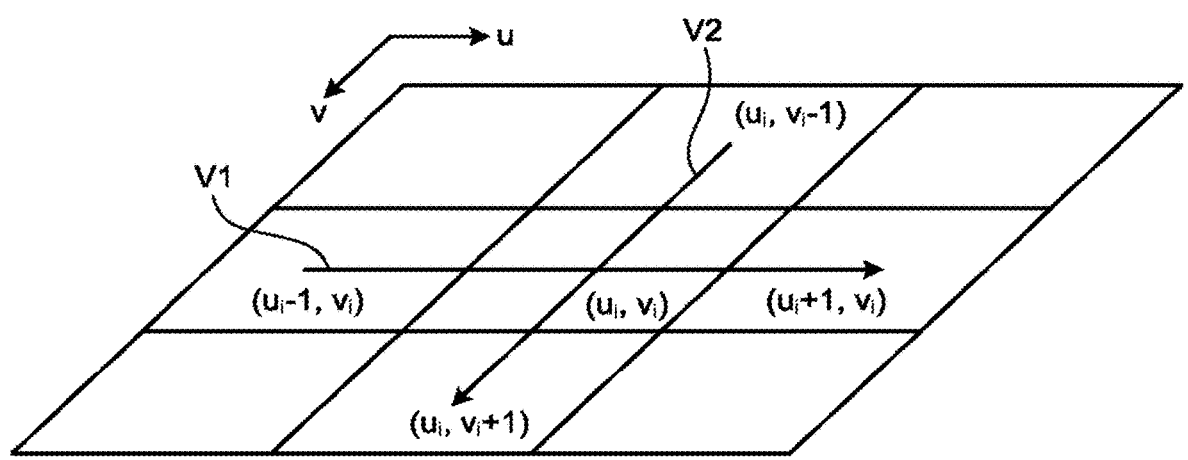
FIG. 10 is a schematic and exemplary view illustrating a proximity region calculate a normal vector for each pixel of the depth image processed by the operating system of the embodiment.

FIG. 10 is a view illustrating a proximity region Ap to calculate a normal vector of each pixel. In FIG. 10, a dot pattern is given to adjacent pixels included in the proximity region Ap of a target pixel. A vector orthogonal to two vectors V1 and V2, that is, a normal vector of the target surface 411 at the corresponding pixel is obtained from an outer product of a difference value (the vector V1) between three-dimensional positions of two adjacent pixels in the u direction and a difference value (the vector V2) between three-dimensional positions of two adjacent pixels in the v direction as illustrated in Formula (2). Accordingly, the target surface detection unit 313a can calculate the reference vector $n_o$ by applying Formula (2) to the center coordinate Po. The vectors V1 and V2 are examples of two vectors along the proximity region Ap. Incidentally, when the positional deviation or the directional deviation is the given determination threshold or less, the reference vector $n_o$ may be used as the unit vector along the target direction Dt in the previous time step stored in the data storage unit 331. In this case, the calculation of the reference vector $n_o$ according to Formula (2) can be omitted.

Next, the target surface detection unit 313a detects a point satisfying the following Formula (3) within the specific range Ad as a first region A1 of the target surface 411 (S1104).

$$\|n_{(u_i,v_i)} - n_o\|_2 < s_a \quad (3)$$

Figure 11:
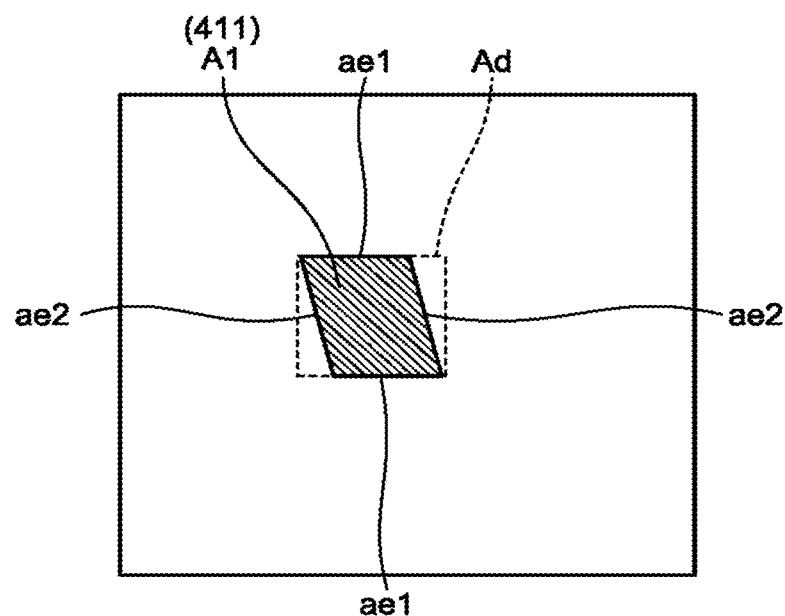
FIG. 11 is a schematic and exemplary view illustrating first region of a target surface detected within the specific range of the depth image processed by the operating system of the embodiment.

The left side of Formula (3) indicates the magnitude of a difference between a normal vector and a reference vector at each position, and the right side of the Formula (3) indicates a threshold serving as a condition for detection as the target surface 411. According to Formula (3), a point having a normal vector whose angular difference with respect to the reference vector $n_o$ is smaller than the threshold is detected as a point constituting the first region A1 of the target surface 411. FIG. 11 is a view illustrating the detected first region A1 regarding the example of FIG. 10. The specific range Ad can be also referred to as a prior detection range.

Next, the target surface detection unit 313a calculates an equation of a reference plane substantially along the target surface 411 from three-dimensional point group data of m points included in the first region A1 (S1105). The equation of the reference plane can be expressed by the following Formula (4).

$$n^T[x,y,z]^T + d = 0 \quad (4)$$

The target surface detection unit 313a calculates non-trivial solutions $n_x$, $n_y$, $n_z$ and d that make the function expressed by the following Formula (5) minimum. Here, the magnitude of $[n_x, n_y, n_z]$ (the normal vector of the reference plane) is 1, and $n_z > 0$.

$$\Sigma_{i=1}^{m} \|n_x x_i + n_y y_i + n_z z_i + d\|_2 \quad (5)$$

Thus, a matrix A expressed by the following Formula (6) is decomposed by singular value decomposition, and an eigenvector for the obtained smallest eigenvalue is d which is the normal vector of the reference plane with respect to the first region A1 of the target surface 411.

$$A = \begin{bmatrix} x_1 & y_1 & z_1 & 1 \\ \vdots & \vdots & \vdots & \vdots \\ x_m & y_m & z_m & 1 \end{bmatrix} \quad (6)$$

The reference plane represented by the obtained eigenvector is an example of an approximate plane of the first region A1. Incidentally, in order to enhance the calculation accuracy of the plane, a function of one norm expressed by the following Formula (7) may be used instead of the function expressed by Formula (5).

$$\Sigma_{i=1}^{m} \|n_x x_i + n_y y_i + n_z z_i + d\|_1 \quad (7)$$

In this case, an approximate solution by the iterative reweighted least squares method is obtained.

Next, the target surface detection unit 313a sets a unit vector of the vector $[n_x, n_y, n_z]$ obtained by the singular value decomposition of Formula (6) as a new reference vector $n_m$, in other words, the target surface detection unit 313a updates the reference vector n, to the reference vector $n_m$, (S1106).

Figure 12:
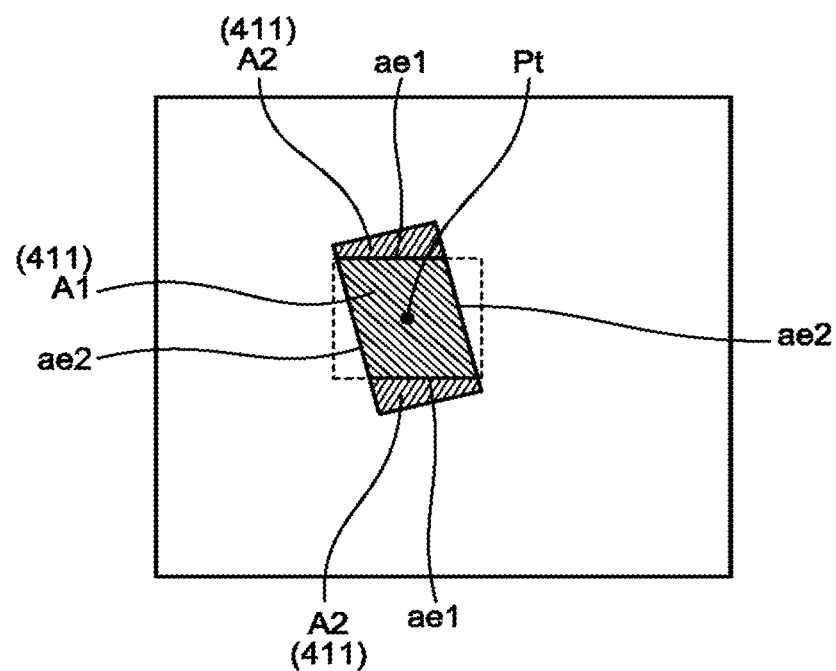
FIG. 12 is a schematic and exemplary view illustrating the first region of the target surface detected within the specific range of the depth image processed by the operating system of the embodiment and a second region of the target surface detected outside the specified range.

Next, the target surface detection unit 313a detects a second region A2 of the target surface 411 outside the specific range Ad (S1107). FIG. 12 is a view illustrating the detected second region A2 regarding the example of FIG. 11. Specifically, the target surface detection unit 313a can detect the second region A2 linked to the first region A1 by a region expansion method. In this case, the target surface detection unit 313a detects a pixel satisfying an addition condition, that is, the pixel satisfying one or both of the following Formulas (8) and (9) among pixels at ends of the target surface 411 (the first region A1 at the start), the pixels adjacent to pixels at an edge ae1 that is an end of the specific range Ad, and adds the detected pixel to the target surface 411. The added pixel becomes a pixel of the new edge ae1 of the target surface 411. Thus, the target surface 411 is expanded.

$$\|n_{(u_i,v_i)} - n_m\|_2 < s_{c1} \quad (8)$$

$$|n_x x_i + n_y y_i + n_z z_i + d| < s_{c2} \quad (9)$$

Here, Formula (8) indicates that the magnitude of a difference between a normal vector of each pixel and the reference vector $n_m$ is a threshold $S_{c1}$ or less, and Formula (9) indicates that the magnitude of a distance between a three-dimensional position of each pixel and the reference plane is a threshold $S_{c2}$ or less.

Further, the target surface detection unit 313a also detects a pixel, which satisfies one or both of the following Formula (8) and Formula (9), among pixels adjacent to an edge pixel of the expanded target surface 411, and adds the detected pixel to the target surface 411. Such expansion processing is executed for all edge pixels of the target surface 411, and the detection of the target surface 411 ends when there is no pixel satisfying the addition condition. A region of the target surface 411 expanded by the region expansion method outside the first region A1 becomes the second region A2 of the target surface 411. Incidentally, the target surface detection unit 313a does not execute the above-described expansion of the region from a pixel of an edge ae2 of the first region A1 away from the end of the specific range Ad at the start of detection of the second region A2. This is because it is clear that there is no target surface 411 adjacent to the outside of the edge ae2 in the detection of the first region A1 in S1104.

In addition, the target surface detection unit 313a may calculate the magnitude of a difference between a normal vector and a reference vector for pixels in the entire or a specific partial region outside the first region A1 in the depth image, and execute image processing such as labeling or a region division method for the difference (image of the difference) in each pixel to detect the second region A2 (hereinafter referred to as a third region) linked to the first region A1. In addition, the target surface detection unit 313a may calculate the magnitude of a distance between a three-dimensional position and the reference plane for pixels in the entire or a specific partial region outside the first region A1 in the depth image, and execute image processing such as labeling or a region division method for the difference (image of the difference) in each pixel to detect the second region A2 (hereinafter referred to as a fourth region) linked to the first region A1. Alternatively, the target surface detection unit 313a may detect a pixel, which is included not only in the third region but also in the fourth region as the second region A2.

Next, the movement control unit 313 functions as the position/direction calculation unit 313b, and calculates the target position Pt and the target direction Dt for the detected target surface 411 (31108). In S1108, the position/direction calculation unit 313b sets, for example, a barycenter (a center or a centroid) of all the pixels included in the detected target surface 411, that is, in the detected first region A1 and second region A2 as the target position Pt as described above. In addition, in S1108, the position/direction calculation unit 313b, for example, may calculate the normal vector (unit vector) of the approximate plane calculated using the singular value decomposition for all the pixels included in the detected target surface 411, that is, the detected first region A1 and second region A2 as a unit vector along the target direction Dt, and calculate a representative value such as an average value of normal vectors (unit vectors) of the respective pixels included in the detected target surface 411 as a unit vector along the target direction Dt as described above. The position/direction calculation unit 313b is an example of a position calculation unit as well as an example of a direction calculation unit.

Next, the movement control unit 313 functions as the command value calculation unit 313c, and calculates a command value to operate the actuator 113 such that the positional deviation and the directional deviation are reduced (S1109). In the present embodiment, since the depth camera 200 is attached to the hand 120, the current position Pc is fixed in a camera coordinate system fixed to the depth camera 200. Accordingly, here, a case where control is executed such that the target position Pt approaches the current position Pc, that is, a case where the movement control unit 313 controls the actuator 113 such that a position P, separated from the target position Pt by a distance dc in a direction opposite to the optical axis direction of the depth camera 200, approaches a position $P_e^*$ corresponding to the center of the depth image and the target direction Dt approaches the optical axis direction of the depth camera 200 will be considered. Incidentally, a distance dc is set in accordance with the performance of the depth camera 200. As an example, if a measurement range of the depth camera 200 is 10 cm to 100 cm, the distance dc is set to 10 cm or longer.

The position $P_e$ can be expressed as the following Formula (10).

$$p_e = [p_x, p_y, p_z]^T = M_c^{-1} [u_p, v_p, 1]^T \log(\rho) \qquad (10)$$

Here, $[p_x, p_y, p_z]$ is a position of the position $P_e$ in a three-dimensional space coordinate system fixed to the depth camera 200, $[u_p, v_p]$ is a position coordinate of the position $P_e$ on the depth image, and $\rho = z_p/d_c$, $z_p$ is a depth (distance) of the position $P_e$.

In addition, a unit vector in the optical axis direction can be expressed as the following Formula (11).

$$\bar{n}^* = [0,0,1]^T \qquad (11)$$

In S1109, the command value calculation unit 313c then uses an outer product vector u of the normal vector in the target direction Dt and a unit vector $[0,0,1]^T$ in the optical axis direction as a rotation axis to calculate an angle θ (angular deviation) between the normal vector of the target direction Dt and the unit vector in the optical axis direction based on an inner product of these vectors. In this case, the outer product is expressed by the following Formula (12), and the inner product is expressed by the following Formula (13).

$$\bar{n} \times \bar{n}^* = [n_X, n_Y, n_Z]^T \times [0,0,1]^T = [n_Y, -n_X, 0]^T \qquad (12)$$

$$\bar{n} \cdot \bar{n}^* = [n_X, n_Y, n_Z]^T \cdot [0,0,1]^T = n_Z \qquad (13)$$

The deviation between the normal vector of the target direction Dt and the unit vector $[0, 0, 1]^T$ in the optical axis direction can be expressed as the following Formulas (14) and (15).

$$\theta = \cos^{-1}(n_Z) \qquad (14)$$

$$u = [n_Y/\sqrt{n_X^2 + n_Y^2}, -n_X/\sqrt{n_X^2 + n_Y^2}, 0]^T \qquad (15)$$

In S1109, the command value calculation unit 313c then calculates a command value v (speed command value) for the actuator 113 regarding the movement of the hand 120 as in the following Formula (16). This is described in E. Malis, F. Chaumette and S. Boudet, "2D 1/2 visual servoing stability analysis with respect to camera calibration errors," Proceedings of the 1998 IEEE/RSJ International Conference on Intelligent Robots and Systems. Innovations in Theory, Practice and Applications, 1998, vol. 2, pp. 691 to 697.

$$v = -\lambda \begin{bmatrix} \frac{1}{d_c \rho} L_v & L_w \\ 0 & I_3 \end{bmatrix}^{-1} e \qquad (16)$$

Here, $$e = [p_e - p_e^*, u^T \theta]^T$$

$$L_v = \begin{bmatrix} -1 & 0 & p_x \\ 0 & -1 & p_y \\ 0 & 0 & -1 \end{bmatrix}$$

-continued $$L_w = \begin{bmatrix} p_x p_y & -(1+p_x^2) & p_y \\ (1+p_x^2) & -p_x p_y & -p_x \\ -p_y & p_x & 0 \end{bmatrix}$$

is established.

In addition, $\lambda$ is a positive scalar gain to adjust convergence speed of a visual servo, and $I_3$ is a (3×3) unit matrix. $P_e^*$ is the position corresponding to the center of the depth image, and thus, can be expressed as follows.

$$P_e^* \times M_c^{-1} [w/2, h/2, 1]^T \tag{17}$$

Next, the movement control unit 313 compares the deviation with a threshold (S1110). A vector e in Formula (16) contains the positional deviation and the directional deviation. In S1110, the movement control unit 313 compares the positional deviation with the corresponding position threshold, and compares the directional deviation with the corresponding direction threshold. The movement control unit 313 ends the movement control when the positional deviation is the position threshold or less and the directional deviation is the direction threshold or less (Yes in S1110). On the other hand, when the positional deviation is greater than the position threshold or the directional deviation is greater than the direction threshold (No in S1110), the movement control unit 313 stores data of the target position Pt (for example, a coordinate, a depth value, and a three-dimensional position in the depth image) and data of the target direction Dt (for example, a value of the normal vector) in the data storage unit 331 (S1111). As described above, the data stored in the data storage unit 331 is used in movement control at the next time step. After S1111, S11 at the next time step is executed. In other words, the movement control at the next time step is started.

As described above, in the present embodiment, the movement control unit 313 (control unit 310) calculates the given target position Pt (first position) and target direction Dt (first direction) for the target surface 411 detected from the depth image, the movement control unit 313 controls the actuator 113 so as to reduce the positional deviation between the current position Pc (second position) fixed to the hand 120 (movable member) and the target position Pt and to reduce the directional deviation between the current direction Dc (second direction) fixed to the hand 120 and the target direction Dt. According to such a configuration, there is no need for an image of a target object required for a typical visual servo, and thus, the control device 300 executes the servo control based on the position and direction of the target surface 411 obtained from the depth image and can more easily cause the hand 12C to be located at the target position Pt and directed in the target direction Dt, for example, even in a case where there is no image of the target object such as an unknown object, a case where it is difficult to extract feature quantities by image processing such as a plain box, a case where it is difficult to obtain an identifiable image of a target surface, and the like.

In addition, the position/direction calculation unit 313b (direction calculation unit) calculates the target direction Dt as the normal direction of the approximate plane of the detected target surface 411 in e present embodiment. According to such a configuration, when the target surface 411 is, for example, a flat surface, a surface substantially along a flat surface, a surface having minute unevenness substantially along a flat surface, or a surface which does not deviate significantly from a flat surface such as a curved surface having a relatively large radius of curvature, it is possible to obtain an advantage that the target direction Dt can be set by a relatively simple calculation.

In addition, tree position/direction calculation unit 313b calculates, for each pixel in the detected target surface 411, the normal direction of the target surface 411 from the three-dimensional position of the proximity region Ap including a plurality of pixels adjacent to the pixel, and calculates the target direction Dt as the representative value of the normal direction of the plurality of pixels in the detected target surface 411 in the present embodiment. According to such a configuration, when the target surface 411 is, for example, a flat surface, a surface substantially along a flat surface, a surface having minute unevenness substantially along a flat surface, or a surface which does not deviate significantly from a flat surface such as a curved surface having a relatively large radius of curvature, it is possible to obtain an advantage that the target direction Dt can be set by a relatively simple calculation.

In addition, the position/direction calculation unit 313b calculates the normal direction of the target surface 411 from the outer product of the two vectors V1 and V2 along the proximity region Ap in the present embodiment. According to such a configuration, for example, the normal direction can be calculated by a relatively simple calculation.

In addition, the target surface detection unit 313a detects the first region A1 of the target surface 411 in the specific range Ad narrower than the entire region of the depth image, and detects the second region A2 linked to the first region A1 outside the specific range Ad in the present embodiment. According to such a configuration, the target surface 411 can be detected more quickly as compared with, for example, a case where the detection of the target surface 411 is executed for the entire region of the depth image or a case where the entire region of the target surface 411 is output by being expanded from the initially detected one point or narrow region.

In addition, in the subsequent time step (second time) in the present embodiment, the first region A1 is detected within the specific range Ad set based on the coordinates in the depth image of at least one point in the target surface 411 detected in the previous time step (first time), and the second region A2 is detected outside the specific range Ad. According to such a configuration, the specific range Ad at the subsequent time step is set based on the coordinates of the target surface 411 detected in the previous time step, and thus, the target surface 411 can be detected more quickly as compared with a case where the specific range Ad is not set. Incidentally, the previous time step may be a time step before the immediately preceding time step.

Second Embodiment

Figure 13:
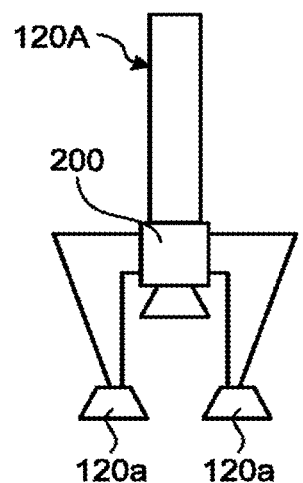
FIG. 13 is an exemplary configuration view of a hand of an operating system of a second embodiment.

FIG. 13 is a side view of a hand 120A of the present embodiment. As illustrated in FIG. 13, the hand 120A has two suction cups 120a, and grips the target object 410 by holding the target surface 411 by suction using one of or the two suction cups 120a in the present embodiment.

When the weight of the target object 410 is relatively light or when the target object 410 is relatively small, the target object 410 can be gripped by one of the two suction cups 120a. If a size or a weight of the target object 410 is known or detectable and at least one thereof is its threshold or less, the current position Pc is set to a suction position of the target surface 411 by any one suction cup 120a of the two suction cups 120a, and the following Formula (18), for example, is used instead of the above Formula (17).

$$P_e^* = M_c^{-1} [w/2, h/2, 1]^T + [0, w_c/d_c, 0]^T \tag{18}$$

Here, $w_c/d_c$ is an offset length in the optical axis direction, and $w_c$ is a distance between the suction cup 120a and the depth camera 200.

On the other hand, when the target object 410 is held by the two suction cups 120a, for example, the position/direction calculation unit 313b calculates an angular deviation between a representative posture (second target direction) of the target surface 411 and a given posture (reference direction) of the hand 120 in rotation around axis along the target direction Dt of the detected target surface 411.

Figure 14:
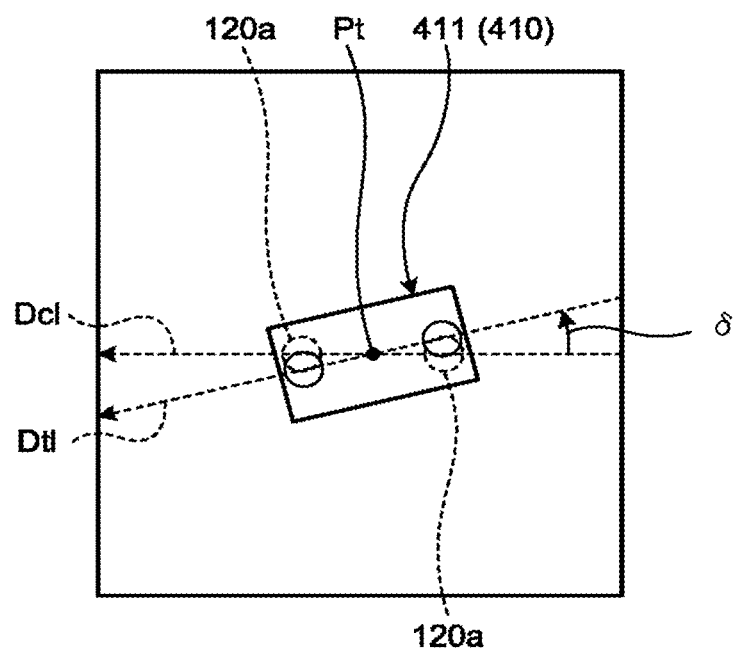
FIG. 14 is an exemplary flowchart illustrating a procedure of processing executed in a movement control unit of the operating system of the second embodiment.
Figure 15:
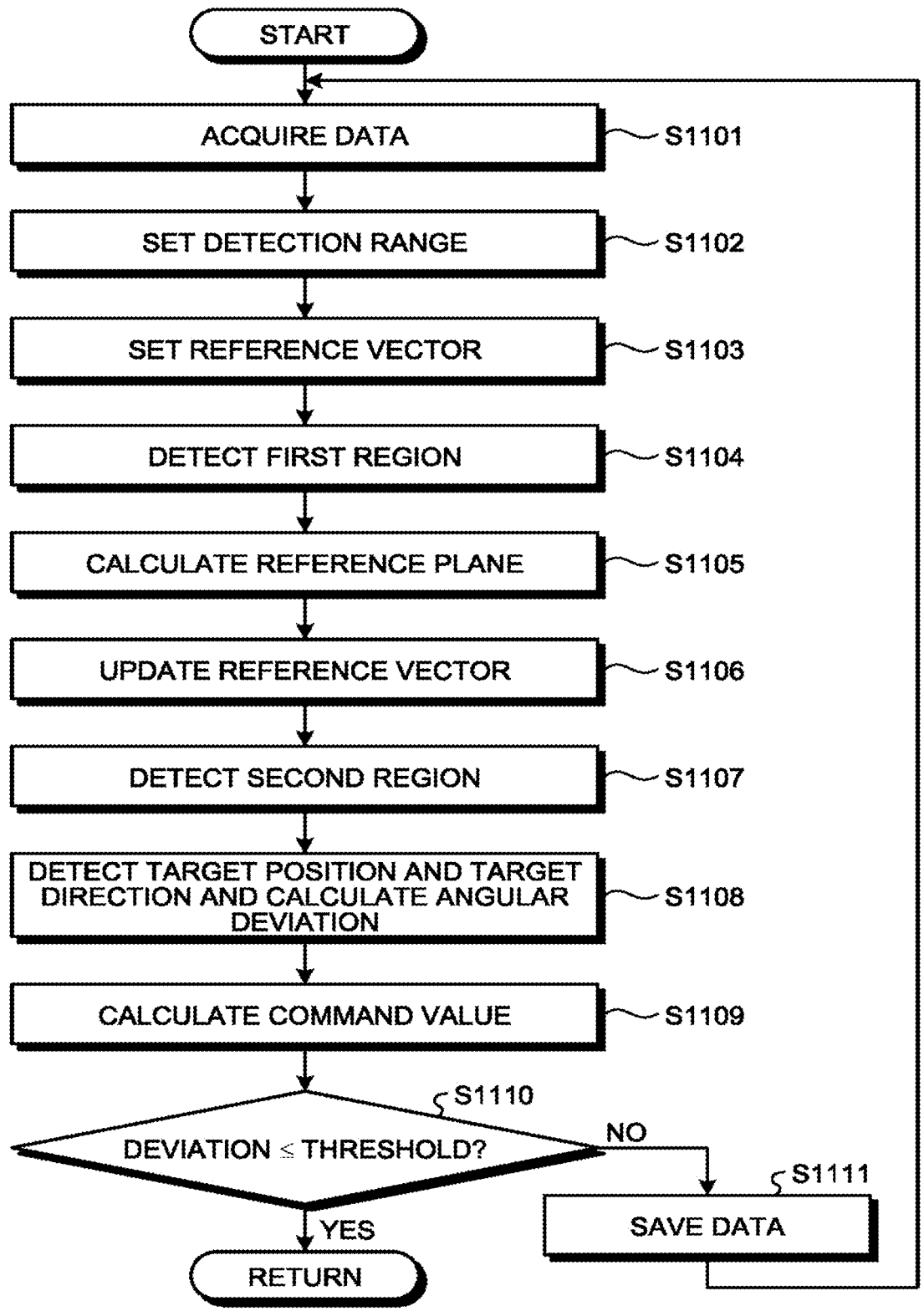
FIG. 15 is a schematic and exemplary view illustrating relative rotation processing about a normal vector of a target surface executed in the movement control unit of the operating system of the second embodiment.

FIG. 14 is a flowchart illustrating a procedure of processing by the control device 300 in this case, and FIG. 15 is a view illustrating the angular deviation. As illustrated in FIG. 15, the reference direction in the present embodiment is set to, for example, an extending direction Dcl of a line segment (reference line segment) that passes through centers of the two suction cups 120a and is orthogonal to the current direction Dc, and the movement control unit 313 sets a longitudinal direction Dtl of the detected target. surface 411 as a second target direction and controls the actuator 113 so as to reduce an angular deviation δ between the longitudinal direction Dtl and the direction Dcl. The second target direction is defined set from the detected target surface 411 according to a given algorithm. The longitudinal direction Dtl (second target direction) is orthogonal to the target direction Dt (FIG. 5). The target direction Dt can be also referred to as a first target direction.

In the present embodiment, the calculation of the angular deviation is added to S1108 of the first embodiment as apparent from the comparison between FIG. 15 and FIG. 8. In S1108, the position/direction calculation unit 313b calculates the longitudinal direction Dtl (second target direction) of the detected target surface 411 by arithmetic processing on position coordinates corresponding to the detected target surface 411 in a two-dimensional coordinate system of the depth camera 200. As a result, it is possible to relatively easily execute the arithmetic processing of the second target direction and the angular deviation. This is because the reference direction of the hand 120 is fixed in the two-dimensional coordinate system of the depth camera 200. In addition, the position/direction calculation unit 313b calculates the longitudinal direction Dtl (second target direction) using principal component analysis. The position/direction calculation unit 313b is an example of an angular deviation calculation unit.

Specifically, the position/direction calculation unit 313b calculates a difference between a coordinate value $(u_i, v_i)$ of each pixel in a detected depth image of the target surface 411 and a center value $(u_m, v_m)$ thereof in S1108. In S1108, the position/direction calculation unit 313b then constructs a matrix A as the following Formula (19) including the calculated difference.

$$A = \begin{bmatrix} v_0 - v_m & u_0 - u_m \\ v_1 - v_m & u_1 - u_m \\ v_2 - v_m & u_2 - u_m \\ \vdots & \vdots \\ v_N - v_m & u_N - u_m \end{bmatrix} \quad (19)$$

In S1108, the position/direction calculation unit 313b then decomposes the matrix A by singular value decomposition as the following Formula (20).

$$A = UDV^T \quad (20)$$

As a result, the position/direction calculation unit 313b obtains a first column vector of V which is a direction of a first principal component.

$$[\tilde{n}_X, \tilde{n}_Y]$$

The position/direction calculation unit 313b then constructs a vector in a three-dimensional space obtained by adding a one-dimensional coordinate orthogonal to the two-dimensional coordinate system of the depth camera 200 to the two-dimensional coordinate system as in the following Formula (21) in S1108.

$$\tilde{n} = [\tilde{n}_X, \tilde{n}_Y, 0]^T \quad (21)$$

Next, the position/direction calculation unit 313b calculates a deviation between the vector of Formula (21) and a vector expressed by the following Formula (22) as the angular deviation between the longitudinal direction Dtl and the direction Dcl in S1108.

$$\tilde{n}^* = [1, 0, 0]^T \quad (22)$$

The deviation between the vector of Formula (21) and the vector of Formula (22) can be calculated as Formula (25) using an outer product of the following Formula (23) and an inner product of the following Formula (24).

$$\tilde{n} \times \tilde{n}^* = [\tilde{n}_X, \tilde{n}_Y, 0]^T \times [1, 0, 0]^T = [0, 0, -\tilde{n}_Y]^T \quad (23)$$

$$\tilde{n} \cdot \tilde{n}^* = [\tilde{n}_X, \tilde{n}_Y, 0]^T \cdot [1, 0, 0]^T = \tilde{n}_X \quad (24)$$

$$\partial \tilde{u} = \cos^{-1}(\tilde{n}_X) \left[ 0, 0, -\tilde{n}_Y / \sqrt{\tilde{n}_Y^2} \right]^T \quad (25)$$

In S1108, the command value calculation unit 313c calculates a command value so as to reduce a deviation eu represented by the following Formula (26).

$$\theta u = \cos^{-1}(n_Z) \begin{bmatrix} n_Y / \sqrt{n_X^2 + n_Y^2} \\ -n_X / \sqrt{n_X^2 + n_Y^2} \\ 0 \end{bmatrix} + \cos^{-1}(\tilde{n}_X) \begin{bmatrix} 0 \\ 0 \\ -\tilde{n}_Y / \sqrt{\tilde{n}_Y^2} \end{bmatrix} \quad (26)$$

Incidentally, the deviation θu of Formula (26) also includes a deviation between the target direction Dt and the unit vector $[0, 0, 1]^T$ in the optical axis direction.

As described above, according to the present embodiment, the position/direction calculation unit 313b (angular deviation calculation unit) detects the angular deviation between the direction Dcl (reference direction) of the hand 120 (movable member) and the longitudinal direction Dtl (the second target direction or the given posture) of the detected target surface 411 in rotation around axis along the target direction Dt (first direction), and the movement control unit 313 controls the actuator 113 so as to further reduce the angular deviation. According to such a configuration, the control device 300 can cause the hand 120 to be directed in a direction to enable the target object 410 to be easily gripped in accordance with the direction of the target surface 411, a type of hand 120, a specification of the hand 120, and the like.

Incidentally, the method of detecting the second target direction disclosed in the present embodiment is also applicable to a configuration in which the hand 120 grips the target object 410 by another gripping method such as, for example, nipping. In such a case, the position/direction calculation unit 313b can calculate, for example, an angular deviation of a direction (reference direction) of a reference line segment with respect to a lateral direction of the target surface 411 as a second target direction, and the command value calculation unit 313c can calculate a command value so as to reduce the angular deviation. In this case, a relative angle between a second principal component vector obtained by principal component analysis and a unit vector in the reference direction becomes the angular deviation, for example, based on an inner product.

Third Embodiment

Overview of Object Handling System

Figure 16:
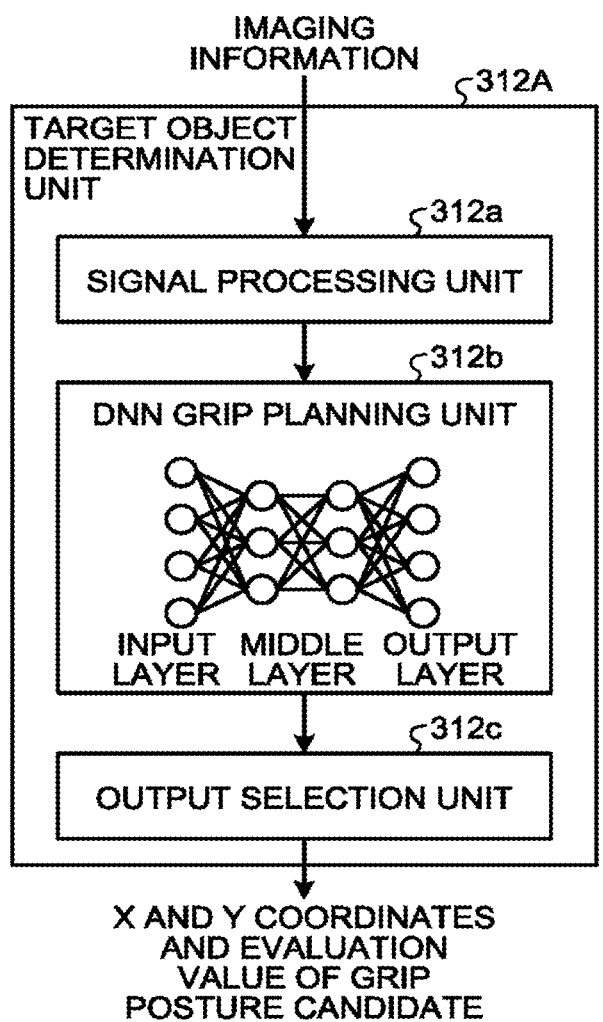
FIG. 16 is an exemplary block diagram of a target determination unit configured by a learned deep neural network of an operating system of a third embodiment.

FIG. 16 is a block diagram of a target determination unit configured using a learned deep neural network (DNN). The DNN is one of machine learning. The operating system 1 of the present embodiment includes a target object determination unit 312A that executes arithmetic processing using machine learning, instead of the target object determination unit 312 of the operating system 1 of the first embodiment. The target object determination unit 312A includes a signal processing unit 312a, a DNN grip planning unit 312b, and an output selection unit 312c.

Imaging information that can be converted into three-dimensional information is input to the signal processing unit 312a. Here, the imaging information that can be converted into the three-dimensional information is, for example, three-dimensional point group information such as a depth image, a plurality of pieces of image data capable of acquiring distance information by measurement of parallax or ultrasonic waves, and a point cloud. The signal processing unit 312a converts a data type of the input imaging information into a data type of a type that can be arithmetically processed by the DNN grip planning unit 312b. Examples of such conversion include conversion of a data format such as conversion of a multi-viewpoint image to a distance image, image processing such as reduction and enlargement of an image sire and a correction of an aspect and camera distortion, and the like.

The DNN grip planning unit 312b outputs not only a coordinate of a grip posture candidate that can be gripped by the hand 120 but also any one of an evaluation value indicating validity of the calculated coordinates and grip success/failure prediction label information on the calculated coordinates or both pieces of information.

The output selection unit 312c selects and outputs information such as X and Y coordinates of a grip point to be finally input to the movement control unit 313 from among the plurality of pieces of input information. This selection is performed using a method of selecting a grip posture candidate with the highest evaluation value from among the grip posture candidates output from the DNN grip planning unit 312b, a method of selecting a center of a region where high evaluation values are concentrated, or the like.

Figure 17:
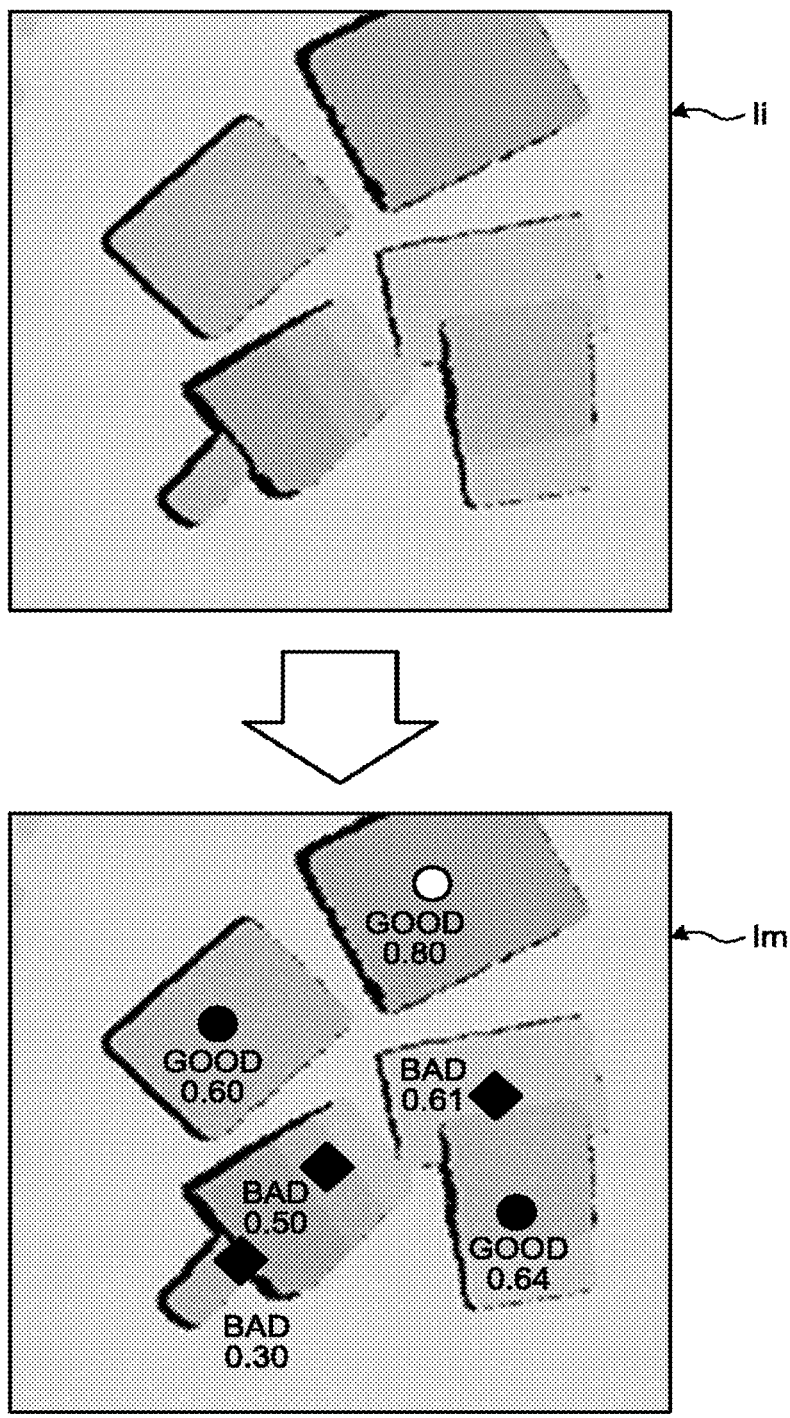
FIG. 17 is an exemplary explanatory view illustrating mapping of an output result by a LYNN grip planning unit with respect to an input image in the operating system of the third embodiment.

FIG. 17 is an explanatory view illustrating mapping of an output result by the DNN grip planning unit 312b with respect to an input image. An image Ii is the input image, and is a depth image captured by the depth camera 200 as an example here. An image Im is a mapping image Im in which the output result by the DNN grip planning unit 312b is superimposed on the input image Ii. In the mapping image Im, grip success/failure prediction labels of "Good" (grippable or a round) and "Bad" (not grippable or a rhombus) and an evaluation value are assigned to each of the grip posture candidates in the input image Ii. A white round indicates a candidate with the highest evaluation value among the grip posture candidates with "Good". Incidentally, the example in which the DNN grip planning unit 312b evaluates the grip posture candidates within a limited range is illustrated in the example of FIG. 17, but the invention is not limited thereto, and the DNN grip planning unit 312b may perform evaluation on the entire input image Ii, and assign labels or evaluation values to all pixels.

Figure 18:
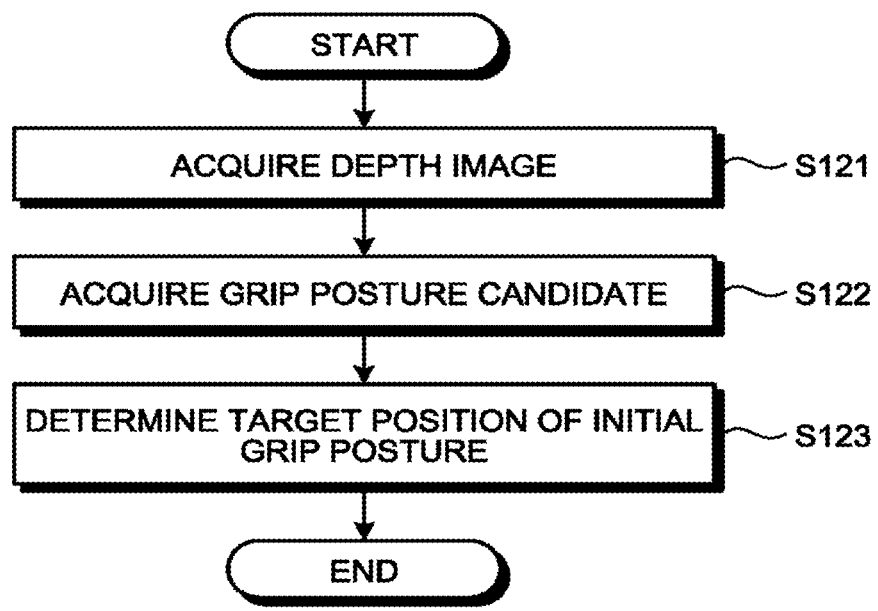
FIG. 18 is an exemplary flowchart illustrating a procedure of determination of an initial grip posture and a target position by a target object determination unit of the operating system of the third embodiment.

FIG. 18 is a flowchart illustrating a procedure of determination of an initial grip posture and a target position by the target object determination unit 312A. As illustrated in FIG. 18, the target object determination unit 312A first acquires a depth image as the input image Ii (S121). In S121, the signal processing unit 312a executes data conversion. Next, the DNN grip planning unit 312b acquires grip posture candidates (S122). Next, the output selection unit 312c determines the initial grip posture from among the plurality of grip posture candidates based on the evaluation value, and determines the target position corresponding to the initial grip posture (S123).

FIG. 19 is a block diagram illustrating a configuration of a learning system 315 that creates the DNN used by the DNN grip planning unit 312b. As illustrated in FIG. 19, the learning system 315 includes an environmental condition input unit 315a, a physical simulator unit 315b, an image acquisition unit 315c, a hand condition input unit 315d, a grip posture candidate generation unit 315e, and a DNN learning processing unit 315f. The environmental condition input unit 315a acquires a basic shape of an object to be handled, an appearance ratio, information on a surrounding environment in which the object is placed, and the like through an external system or a user interface and inputs the acquired condition to the physical simulator unit 315b. The physical simulator unit 315b generates an environmental model to be handled based on a set environmental condition in consideration of random elements.

FIG. 20A is a perspective view illustrating a virtual data model in a bulk state generated on a calculation space by the physical simulator unit 315b, and FIG. 20B is an example of a depth image generated from the virtual data model in the bulk state generated by the physical simulator unit 315b. The image acquisition unit 315c executes processing that simulates imaging processing such as the depth camera 200 on a virtual data model as an environment model, and acquires the depth image.

The hand condition input unit 315d sets conditions of the hand 120 to execute handling, for example, a size of the hand 120 and a grippable size, through the external system or the user interface. Specifically, for example, when the hand 120 is a suction hand, the hand condition input unit 315d sets a position of a suction pad, a size of the pad, and the like as hand conditions. When the hand 120 is a nipping hand, a nipping width, an insertion amount, and the like are set as hand conditions. The hand condition is an example of physical features.

The grip posture candidate generation unit 315e generates information on the grip posture candidate based on the input hand conditions and the environment model generated by the physical simulator unit 315b specifically, for example, coordinates of the grip posture candidate, grip success/failure prediction label information of the grip posture candidate, an evaluation value indicating validity of the grip posture candidate, and the like. FIG. 20C illustrates an example of the grip posture candidate information.

The DNN learning processing unit 315f generates a DNN by executing teaching or deep learning using the input image information and grip posture candidate. The DNN grip planning unit 312*b* executes arithmetic processing using the INN generated by the INN learning processing unit 315*f*.

As described above, in the present embodiment, the target object determination unit 312A outputs the initial grip posture and the target position obtained in consideration of the plurality of conditions such as the state of the placed object and the features of the hand based on the captured depth image, and the movement control unit 313 executes movement control starting from the initial grip posture and the target position output by the target object determination unit 312A. In this manner, according to the operating system 1 including the target object determination unit 312A and the movement control unit 313 using the depth image, for example, an external system or a human is not required to separately input a grip candidate or a goal image (RGB image) serving as the grip candidate, and it is possible to obtain an effect that the reasonable grip and handling are realized even for a new unknown object.

In addition, for example, the target object determination unit 312A uses the neural network to generate the grip posture candidate according to the present embodiment, and thus, various conditions can be set, and it is possible to obtain an effect that a processing time for the candidate calculation is relatively short.

Further, according to the present embodiment, for example, at the time of learning of the neural network, the learning system 315 automatically generates the depth image to be input and teaching data from the environment model generated by the simulator and performs supervised learning, and thus, it is possible to obtain an effect that it is possible to generate the DNN of the target object determination unit 312A even in a real environment or a situation where there is no color image such as a goal image.

Fourth Embodiment

Figure 21:
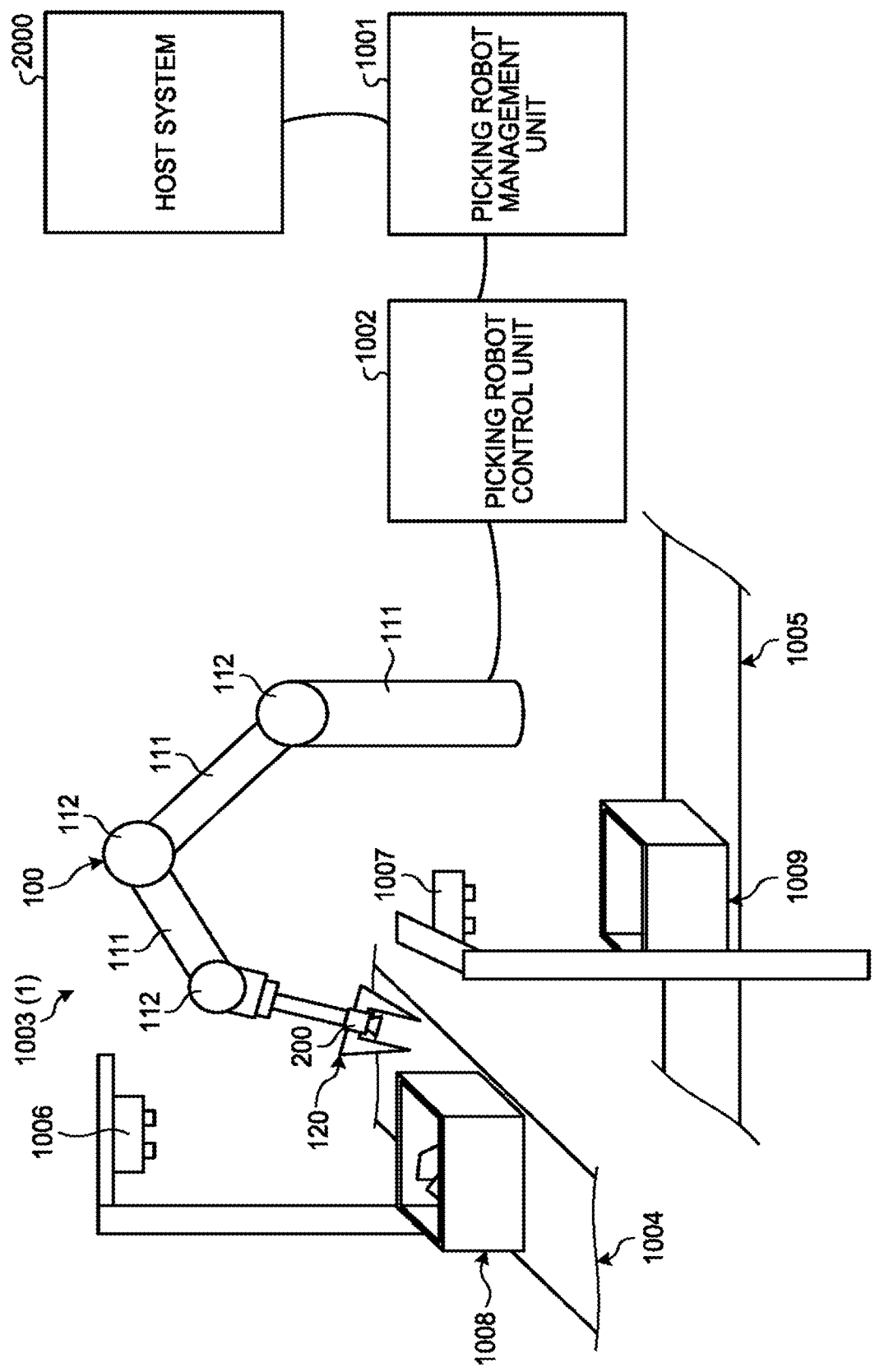
FIG. 21 is an exemplary block diagram of a picking system of a fourth embodiment.

FIG. 21 is a block diagram of a picking system 1000 of a fourth embodiment. As illustrated in FIG. 21, the picking system 1000 is connected to a host system 2000 that performs processing such as a picking order, and includes a picking robot management unit 1001, a picking robot control unit 1002, a picking robot system 1003 which is an example of the operating system 1, a storage box conveyance unit 1004, a delivery box conveyance unit 1005, a storage box capturing unit 1006, and a delivery box capturing unit 1007. A storage box 1008 can be also referred to as a bin, and a delivery box 1009 can be also referred to as a tote.

The host system 2000 determines a package to be delivered, and executes a process of sweeping out the storage box 1008 in which articles to be delivered from an external warehouse system such as an automatic warehouse are stored, and outputs a picking order for the delivery box 1009 to the picking system 1000. In the picking system 1000, the picking robot management unit 1001 receives the picking order, acquires the number of target articles to be processed by the picking system 1000, determines article-related information such as a weight and an outer size of the target article, a corresponding hand, and a processing parameter, and inputs those pieces of information into the picking robot control unit 1002. The picking robot control unit 1002 controls the picking robot system 1003 to perform picking and packing work based on the article-related information. The picking robot system 1003 includes the arm 111, the joint 112, the hand 120, a tool changer unit, a force sensor, a contact sensor, a grip joint, a suction pad, and the like.

The storage box conveyance unit 1004 pulls in the storage box 1008 expelled from the external warehouse system into a processing range of the picking robot system 1003 according to the information the picking robot management unit 1001. The delivery box conveyance unit 1005 pulls in an empty box at the start of picking, and executes a process of shipping the delivery box 1009 in which the article has been packed when the delivery box is full or when the picking is finished. The storage box capturing unit 1000 has a function of capturing a depth image or a three-dimensional state of the storage box 1008 in the state where the storage box 1008 has been conveyed to an operating range of the picking robot system 1003. The delivery box capturing unit 1007 has a function of capturing a depth image or a three-dimensional state of the delivery box 1009 in a state where the delivery box 1009 has been conveyed to the operating range of the picking robot system 1003.

FIG. 22 is a flowchart illustrating a procedure of picking using the picking system 1000. In the picking system 1000, picking is started when the picking robot management unit 1001 receives a picking order.

In S201, the picking robot management unit 1001 acquires information of an article designated in the picking order from a database. An optimum hand is determined based on a size of the hand 120 and a gripping method such as suction and nipping from the acquired information. Then, a picking instruction is issued to the picking robot system 1003 having the optimum hand 120, and the storage box conveyance unit 1004 is controlled to cause the storage box 1008 in which the ordered article has been stored to be delivered to the determined picking robot system 1003.

In S202, the picking robot system 1003 captures the storage box 1008 that has been pulled in using the storage box capturing unit 1006 to acquire an image. The target object determination unit 312 or the target object determination unit 312A of the picking robot system 1003 determines the article or a gripping surface of the article to be subjected to the picking based on the acquired image.

In S203, the picking robot system 1003 controls the actuators 113 and 114 according to position information determined in advance (predetermined position information) to move the hand 120 to a given position near the storage box 1008.

In S204, the picking robot system 1003 uses a camera of the storage box capturing unit 1006 to execute position control such that the article or the gripping surface of the article to be picked obtained in S202 enters the field of view of the depth camera 200 provided on the hand 120.

In S205, the picking robot system 1003 uses the depth camera provided on the hand 120 to bring the hand 120 closer to the target article according to the flow described in FIG. 3.

In S206, the picking robot system 1003 uses a detected value of the force sensor provided on the hand 120 or encoder information or a current control amount of a motor as the actuators 113 and 114 to measure a force applied to the hand 120, uses force control to cause the hand 120 to abut against the target article, causes the suction pad or the like at the tip of the hand 120 to follow the target article, and executes gripping of the target article.

In S207, the picking robot system 1003 moves the arm 111 and the hand 120 according to the position information set in advance, and moves the gripped article closer to the delivery box 1009.

In S208, the delivery box capturing unit 1007 captures an image of the delivery box 1009. The picking robot system 1003 senses a state of the previously placed article or the like, and determines a packable position.

In S209, the picking robot system 1003 executes movement control by position control of the gripped article using information on the packable position, and moves the gripped article to the vicinity of the packable position.

In S210, the picking robot system 1003 controls the movement of the hand 120 by force control to press the gripped article against an inner surface of the delivery box 1009, and releases the gripping of the article in the state of reaching a given force to place, and packs the article in the delivery box 1009.

In S211, the picking robot system 1003 determines whether to end picking. If an unprocessed article remains among the ordered articles, the picking process is resumed from S202. If all of the ordered articles have been processed, the processing proceeds to S212.

In S212, the picking robot system 1003 moves the arm 111 and the hand 120 to initial positions, performs shipping of the delivery box 1009, and completes the picking process for the order.

Although the picking system 1000 including the picking robot system 1003 as the operating system 1 has been described in the present embodiment as described above, the configuration and control of the above embodiment can be also applied to other systems, for example, assembly work to hold parts using a robot, utilization in a field to grip and convey an object using a robot, and an inspection in which sensing is performed by bringing an end effector such as a sensor attached to a robot close to an object.

For example, the position of the depth camera and the number thereof are not limited to those in the above embodiment, and two or more depth cameras may be provided and the depth camera may be provided at another position. In addition, the processing object (target object) is not necessarily rectangular, and may have various shapes. In addition, the target surface is not necessarily a completely flat surface, and it is possible to apply the configuration and the method of the above embodiment even when the target surface is an uneven surface or a gently curved surface, for example, by setting of the detection reference (threshold) in the target surface detection unit. In addition, the storage unit may store data indicating the specific range calculated already and data serving as a source to obtain the specific range in the subsequent time step, instead of the coordinates of at least one point included in the target surface in the previous step.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operating system comprising:
a movable member;
an actuator that moves the movable member;
a storage; and
one or more hardware processors configured to implement:
a target surface detection unit that detects a target surface of a target object from a depth image obtained by a depth sensor, wherein coordinates in the depth image are stored in the storage for at least one point in the detected target surface that is detected at a first time;
a position calculation unit that calculates a first position for the detected target surface;
a direction calculation unit that calculates a first direction for the detected target surface; and
a movement control unit that controls the actuator so as to reduce a positional deviation between a second position fixed with respect to the movable member and the first position and to reduce a directional deviation between a second direction fixed with respect to the movable member and the first direction, wherein
the target surface detection unit sets a specific range that is narrower than a whole region of the depth image based on a stored coordinate, and detects a first region of the detected target surface within the specific range and detects a second region linked to the first region as the target surface outside the specific range at a second time after the first time.

2. The operating system according to claim 1, wherein the direction calculation unit calculates the first direction as a normal direction of an approximate plane of the detected target surface.

3. The operating system according to claim 1, wherein the direction calculation unit calculates, for each pixel in the detected target surface, a normal direction from a three-dimensional position of a proximity region including the each pixel and a plurality of pixels adjacent to the pixel, and calculates the first direction as a representative value of the normal direction in the plurality of pixels in the detected target surface.

4. The operating system according to claim 3, wherein the direction calculation unit calculates the normal direction from an outer product of two vectors along the proximity region.

5. The operating system according to claim 1,
wherein
the one or more hardware processors are configured to further implement an angular deviation calculation unit that calculates an angular deviation from a given posture of the movable member in rotation around an axis along the first direction of the detected target surface, and
the movement control unit controls the actuator that moves the movable member so as to further reduce the angular deviation.

6. The operating system according to claim 5, wherein the one or more hardware processors are configured to further implement a target object determination unit that includes a network learned by learning data generated based on imaging information that is transformed into three-dimensional information and a physical feature of the movable member, and determines the target object corresponding to the acquired imaging information.

7. A control device comprising:
one or more hardware processors configured to implement:
a target surface detection unit that detects a target surface of a target object from a depth image obtained by a depth sensor, wherein coordinates in the depth image are stored in a storage for at least one point in the detected target surface that is detected at a first time,
a position calculation unit that calculates a first position for the detected target surface, a direction calculation unit that calculates a first direction for the detected target surface, and a movement control unit that controls an actuator that moves a movable member so as to reduce a positional deviation between a second position fixed with respect to the movable member and the first position and to reduce a directional deviation between a second direction fixed with respect to the movable member and the first direction, wherein the target surface detection unit sets a specific range that is narrower than a whole region of the depth image based on a stored coordinate, and detects a first region of the detected target surface within the specific range and detects a second region linked to the first region as the target surface outside the specific range at a second time after the first time.

8. The control device according to claim 7, wherein the one or more hardware processors are configured to further implement a target object determination unit that includes a network learned by learning data generated based OD imaging information that is transformed into three-dimensional information and a physical feature of the movable member, and determines the target object corresponding to the acquired imaging information.

9. A computer program product having a non-transitory computer readable medium including instructions, wherein the instructions, when executed by a computer, cause the computer to function as the target surface detection unit, the position calculation unit, the direction calculation unit, and the movement control unit of the operating system according to claim 1.

10. A method comprising:
detecting, by one or more hardware processors, a target surface of a target object from a depth image obtained by a depth sensor, wherein coordinates in the depth image are stored in a storage for at least one point in the detected target surface that is detected at a first time;
calculating, by the one or more hardware processors, a first position for the detected target surface;
calculating, by the one or more hardware processors, a first direction for the detected target surface; and
controlling, by the one or more hardware processors, an actuator that moves a movable member so as to reduce a positional deviation between a second position fixed with respect to the movable member and the first position and to reduce a directional deviation between a second direction fixed with respect to the movable member and the first direction; and
setting, by the one or more hardware processors, a specific range that is narrower than a whole region of the depth image based on a stored coordinate, and detecting a first region of the detected target surface within the specific range and detects a second region linked to the first region as the target surface outside the specific range at a second time after the first time.

* * * * *